US009906055B2

(12) United States Patent
Taga et al.

(10) Patent No.: US 9,906,055 B2
(45) Date of Patent: Feb. 27, 2018

(54) CHARGER

(71) Applicant: MAKITA CORPORATION, Anjo-shi, Aichi (JP)

(72) Inventors: Hideyuki Taga, Anjo (JP); Yasuhiro Tabuchi, Anjo (JP); Hidenori Nagasaka, Anjo (JP); Kiyozumi Kokawa, Anjo (JP); Shinsuke Okuda, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 399 days.

(21) Appl. No.: 14/400,683

(22) PCT Filed: May 28, 2013

(86) PCT No.: PCT/JP2013/064729
§ 371 (c)(1),
(2) Date: Nov. 12, 2014

(87) PCT Pub. No.: WO2013/190955
PCT Pub. Date: Dec. 27, 2013

(65) Prior Publication Data
US 2015/0137758 A1   May 21, 2015

(30) Foreign Application Priority Data

Jun. 20, 2012   (JP) .................................. 2012-138952
Jun. 20, 2012   (JP) .................................. 2012-138953
(Continued)

(51) Int. Cl.
*H02J 7/00* (2006.01)
*H01M 10/46* (2006.01)
*H01M 10/052* (2010.01)

(52) U.S. Cl.
CPC ........... *H02J 7/0042* (2013.01); *H01M 10/46* (2013.01); *H02J 7/0045* (2013.01); *H01M 10/052* (2013.01); *H02J 7/0013* (2013.01)

(58) Field of Classification Search
CPC ..................................................... H02J 7/0042
(Continued)

(56) References Cited

U.S. PATENT DOCUMENTS 4,591,777 A * 5/1986 McCarty ............... H02J 7/0013
15/DIG. 1
5,035,024 A * 7/1991 Steiner ...................... A47L 5/24
15/339

FOREIGN PATENT DOCUMENTS

EP   1162711 A1   12/2001
JP   A-8-23367   1/1996
(Continued)

OTHER PUBLICATIONS

JP 2009296724, Dec. 2009, Shimizu et al, Charger Translation.*

(Continued)

Primary Examiner — Robert Grant
Assistant Examiner — Tynese McDaniel
(74) Attorney, Agent, or Firm — Oliff PLC

(57) ABSTRACT

A pair of right and left fixing holes and a pair of strap attachment holes are provided on a rear surface of a main body housing at a position which does not protrude from a side area S in a planar view. A bottom edge portion of an upper recessed portion is provided above the fixing hole to cover each of the right and left fixing holes, the strap attachment holes are provided to be coaxial with the bottom edge portion, and it is ensured that durability and compactness of the charger are obtained.

4 Claims, 27 Drawing Sheets

(30) Foreign Application Priority Data

| Jun. 20, 2012 | (JP) | ................................. 2012-138954 |
| Jun. 20, 2012 | (JP) | ................................. 2012-138955 |
| Jun. 20, 2012 | (JP) | ................................. 2012-138956 |
| Jun. 20, 2012 | (JP) | ................................. 2012-138957 |

(58) Field of Classification Search
USPC ......................................................... 429/158
See application file for complete search history.

(56) References Cited

FOREIGN PATENT DOCUMENTS

| JP | A-2003-284656 | 10/2003 |
| JP | 2007-295677 A1 | 11/2007 |
| JP | A-2008-236881 | 10/2008 |
| JP | 2009296724 A * | 12/2009 |
| JP | A-2009-296724 | 12/2009 |

OTHER PUBLICATIONS

Jan. 27, 2016 Extended Search Report issued in European Patent Application No. 13806253.4.
International Search Report issued in PCT/JP2013/064729 dated Aug. 13, 2013 (with translation).

* cited by examiner

CHARGER

BACKGROUND OF THE INVENTION

Field of the Invention

The present invention relates to a charger for charging a battery pack (secondary battery) used as a power source, for example in an electric tool such as a chargeable type screw fastening machine.

Description of the Related Art

This kind of battery pack is detached from a tool main body and is charged by a separately prepared charger, and thus, the battery pack can be repeatedly used. With respect to the charger, in order to improve the function or increase the usability, various methods have been performed in the related art. For example, Japanese Laid-Open Patent Publication No. 2009-296724 below discloses a technology to increase usability when the battery pack is attached and detached in the situation where the charger is a wall-hanging type charger.

However, it is necessary to further improve the wall-hanging structure of the related art as follows. In the wall-hanging structure of the related art, a so-called tumbler-shaped hole is provided on a bottom surface of the charger, and the charger is maintained in a wall-hanging state in a state where a protrusion provided on a wall side is hooked on the tumbler-shaped hole and is hung. Accordingly, for example, when a person carelessly comes into contact with the charger, or the like, positional deviation of the charger occurs, and when large positional deviation occurs, there is a concern that the protrusion may become disengaged from the tumbler-shaped hole or the like, and thus, there is a problem in that the wall-hanging state of the charger is not stable.

According to the present embodiment, the positional deviation does not occur even when a person carelessly comes into contact with the charger or the like, and the charger can be hung in a more stable state on the wall.

SUMMARY OF THE INVENTION

The above-described problems are solved by the following embodiments.

According to a first embodiment, there is provided a charger that can be mounted in a bottom surface of a main body housing along a wall surface in a wall-hanging posture. The charger includes a battery attachment portion to which a battery pack downwardly slides to attach and from which the battery pack upwardly slides to detach in the wall-hanging posture. The charger is provided with a regulating member that engages with the wall surface in a concave-convex way. The regulating member regulates a relative displacement of the main body housing with respect to the wall surface in a detachment direction of the battery pack.

According to the first embodiment, in the wall-hanging mounting state, the relative displacement (the upward relative displacement) in the battery detachment direction of the charger is regulated by the regulating portion. Accordingly, when the battery pack slides from the battery attachment portion to the upper portion and is detached, a user does not need to press the charger so that the charger is not positionally deviated upward, the user slides the battery pack to the upper portion while grasping the battery pack with one hand, and thus, the battery pack can be simply detached. Therefore, the user can detach the charged battery pack with one hand from the charger in a state where the user holds a tool with the other hand, and in this regard, usability (operability) of the charger can be increased.

According to a second embodiment, in the first embodiment, the main body housing may include a two-piece structure in which a lower divided housing on the wall surface side and an upper divided housing that has the battery pack attachment portion are butted against each other at a joining surface along the wall surface. A lower recessed portion that is inwardly recessed in a side face area in a planar view of the main body housing may be provided in the lower divided housing. A fixing hole for screwing the main body housing to the wall surface may be provided on a bottom edge portion of the lower recessed portion. And, a fixing screw that is inserted through the fixing hole for screw-fastening may function as the regulating member.

According to the second embodiment, the main body housing is screwed via the fixing hole, and compared to a hooked state in which only a tumbler-shaped hole is used, the main body housing can be mounted in a stable wall-hanging posture.

Moreover, since the fixing hole is provided on the bottom edge portion provided at the position which does not protrude from the side area in a planar view of the main body housing, even when the charger drops or the like, damage to the bottom edge portion can be prevented in advance, and thus, the thickness of the bottom edge portion is decreased, and durability of the main body housing can be increased while the required length of the fixing screw is shortened.

Moreover, since the screwing is performed via the fixing hole of the lower divided housing side, as compared to when the screwing is performed via the fixing hole of the upper divided housing side, the length of the fixing screw can be shortened.

According to a third embodiment, in the second embodiment, an upper recessed portion may be provided in the upper divided housing at the same position as the lower recessed portion in a planar view, and a bottom edge portion of the upper recessed portion may be positioned in the upper portion of the fixing hole.

According to the third embodiment, the bottom edge portion of the upper recessed portion is disposed to cover the upper portion of the bottom edge portion of the lower recessed portion on which the fixing hole is provided, and in this regard, the bottom edge portion of the lower recessed portion is not easily damaged.

According to a fourth embodiment, in the third embodiment, a through-hole that is coaxial with the fixing hole may be provided in the bottom edge portion of the upper recessed portion.

According to the fourth embodiment, the through-hole of the upper recessed portion side is used as an operating hole into which a driver (screwdriver) is inserted, and thus, fastening a fixing screw to the fixing hole is easily performed.

Moreover, the upper divided housing and the lower divided housing are provided and the fixing hole and the through-hole are provided, and when the housings are manufactured by resin molding, a molding die can be simplified.

According to a fifth embodiment, in the fourth embodiment, the through-hole may function as a strap attachment hole for attaching a strap for carrying the charger on the shoulder.

According to the fifth embodiment, the charger can be carried in the state where the charger is shouldered, and the function of the through-hole provided on the bottom edge portion of the upper recessed portion can be increased. Moreover, both the attachment hole of the strap for carrying on the shoulder and the fixing hole for the wall-hanging are provided at positions which do not protrude from the side area in a planar view, and thus, the sizes of the main body housing and the charger can be decreased while respective strength is secured.

According to a sixth embodiment, in the first embodiment, hook portions and regulating portions that are used for wall mounting may be provided in four corners of the bottom surface. Recessed hook portions may be provided in a pair of upper right and left hook portions. Hook convex portions provided on the wall surface side may be configured to be hooked over the recessed hook portions such that displacement of the main body housing is regulated in downward and right-left directions with respect to the wall surface and in a direction away from the wall surface. And, the regulating portions may be provided on the right and left sides in pairs and positioned below an engaging convex portion provided on the wall surface side, and the engaging convex portion may function as the regulating member.

According to the sixth embodiment, the charger is mounted on the wall surface in the state where the positional deviation in both the up and the down directions (attachment and detachment directions of the battery pack) is regulated. Accordingly, when the battery pack slides toward the lower portion with respect to the battery attachment portion and is attached to the charger in the wall-hanging state, the user does not need to press the charger with a hand so that the charger is not displaced downward, and if the user slides the battery pack while grasping the battery pack with one hand, it is possible to rapidly and simply attach the battery pack to the battery attachment portion. Moreover, conversely, when the battery pack is detached from the battery attachment portion, it is sufficient if the user slides the battery pack to the upper portion while grasping the battery pack with one hand, and the user does not need to press the charger with the other hand so that the charger itself is not displaced.

In this way, the user does not need to press the charger so that the charger does not move, and if the user vertically slides the battery pack while grasping the battery pack with one hand, the battery pack can be attached to or detached from the battery attachment portion, and thus, usability (operability) of the charger can be increased.

In addition, since the displacement in the up-down and right-left directions of the charger and the displacement of the charger in the direction separated from the wall surface are regulated, even when a person carelessly comes into contact with the charger or the like, the positional deviation is assuredly prevented.

According to a seventh embodiment, in the sixth embodiment, in the lower regulating portion, the upper surface may be provided to be perpendicular to the wall surface or to be inclined in a direction at an acute angle in which a tip side is upwardly displaced.

According to the seventh embodiment, the engagement state to the upper portion of the regulation portion with respect to the engagement convex portion is securely maintained, and the displacement in the detachment direction of the charger is regulated. Thus, usability of the charger can be more assuredly increased.

DETAILED DESCRIPTION OF THE INVENTION

Next, embodiments of the present invention will be described with reference to the drawings. As shown in FIGS. 1 to 5, in the present embodiment, a four-port type charger 10 by which four battery packs B to B can be attached and charged at one time is exemplified. The battery pack B (secondary battery) shown in FIG. 6 can be charged by the charger 10.

Figure 7:
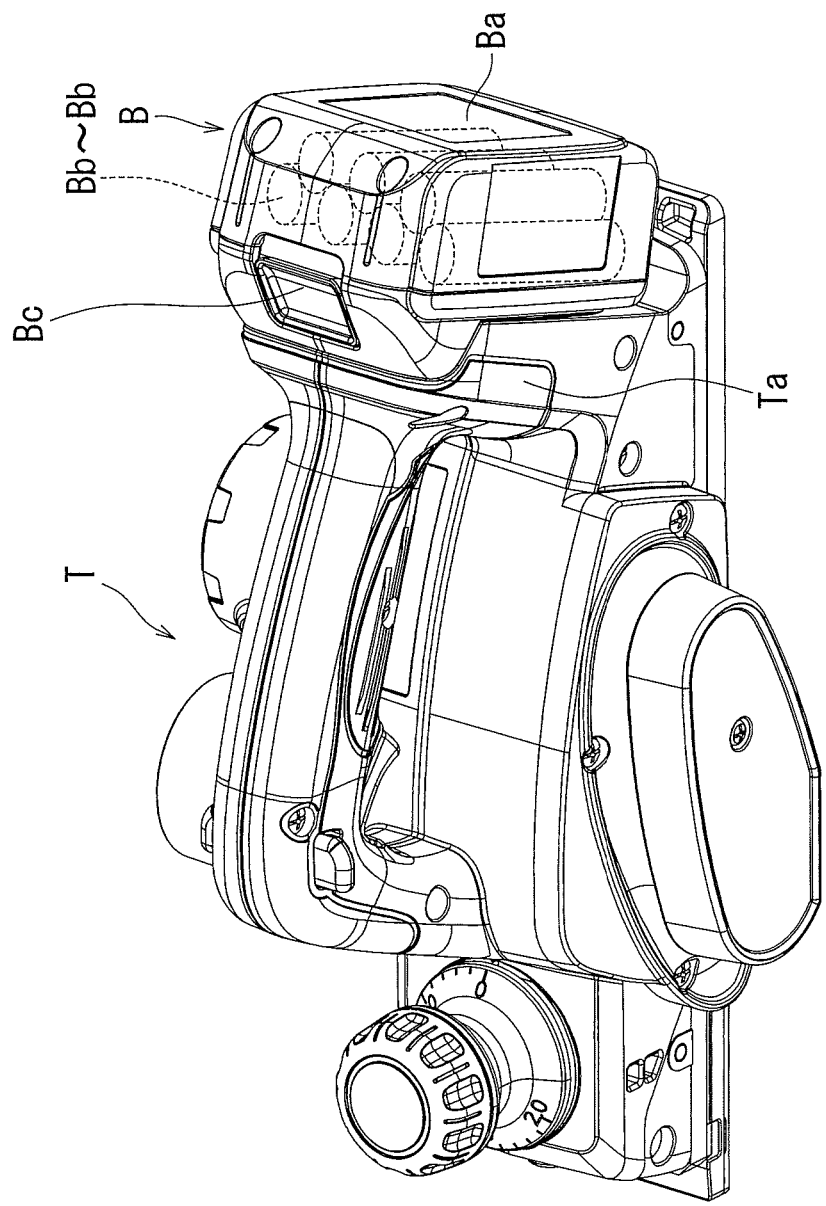
FIG. 7 is an overall perspective view of a chargeable type electric plane.

The battery pack B is a slide attachment type lithium ion battery in which a plurality of battery cells Bb to Bb are housed in a battery case Ba, and as shown in FIG. 7, is used as a power source of a chargeable type electric tool T such as an electric plane. The battery pack B can be attached to the chargeable type electric tool T by sliding the battery pack downward with respect to a battery attachment portion Ta provided on a rear portion of the chargeable type electric tool T, and can be detached from the chargeable type electric tool T by sliding the battery pack upward. The detachment of the battery pack B from the battery attachment portion Ta is performed by sliding a lock-releasing lever Bc provided on the upper surface by a fingertip and by releasing the engaging state with respect to the battery attachment portion Ta.

Figure 6:
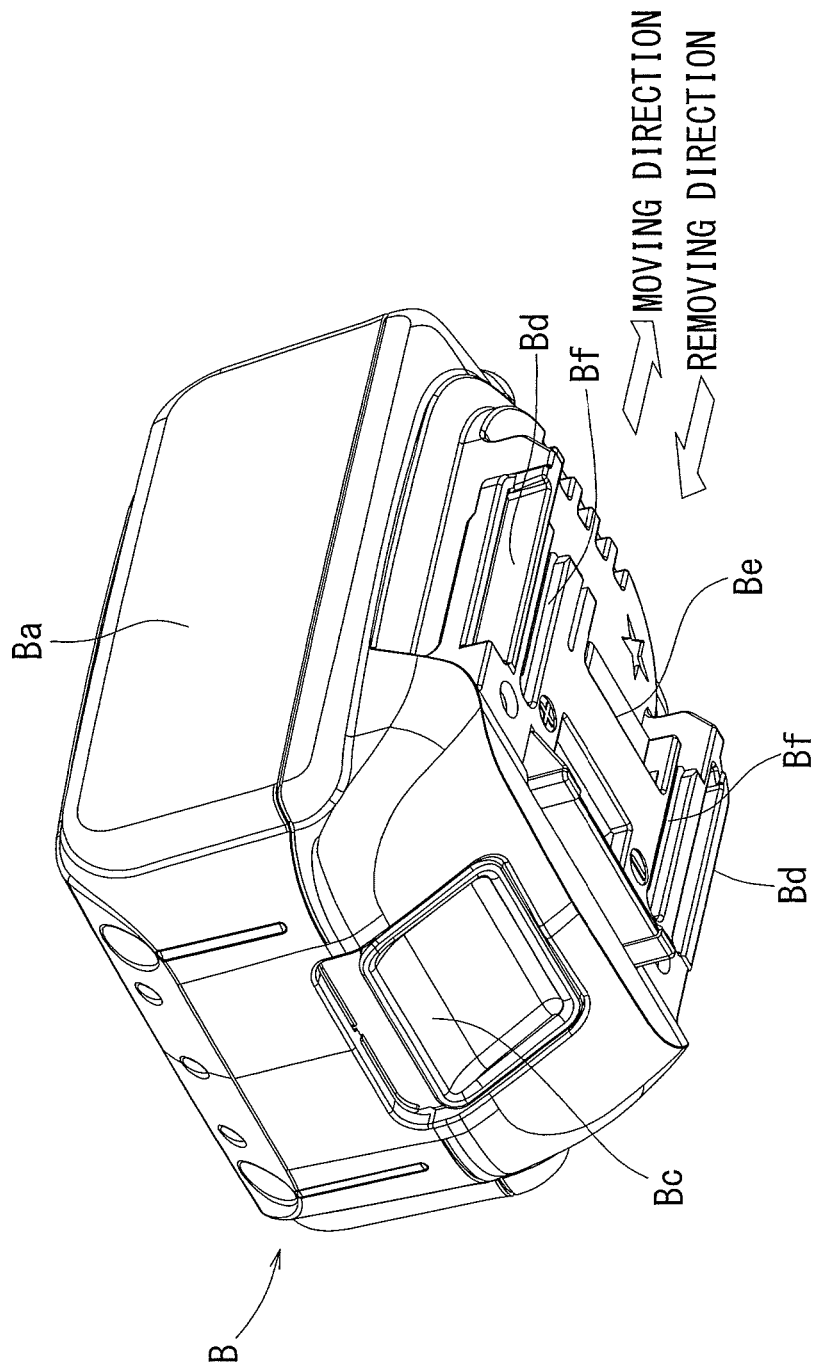
FIG. 6 is a perspective view of a slide attachment type battery pack.

As shown in FIG. 6, a pair of right and left slide rails Bd and Bd for slide attachment is provided on an attachment surface (lower surface of FIG. 6) of the battery pack B. Positive and negative connection terminal portions Bf and Bf and a communication connector Be for the charger or a tool are disposed between both slide rails Bd and Bd.

Figure 1:
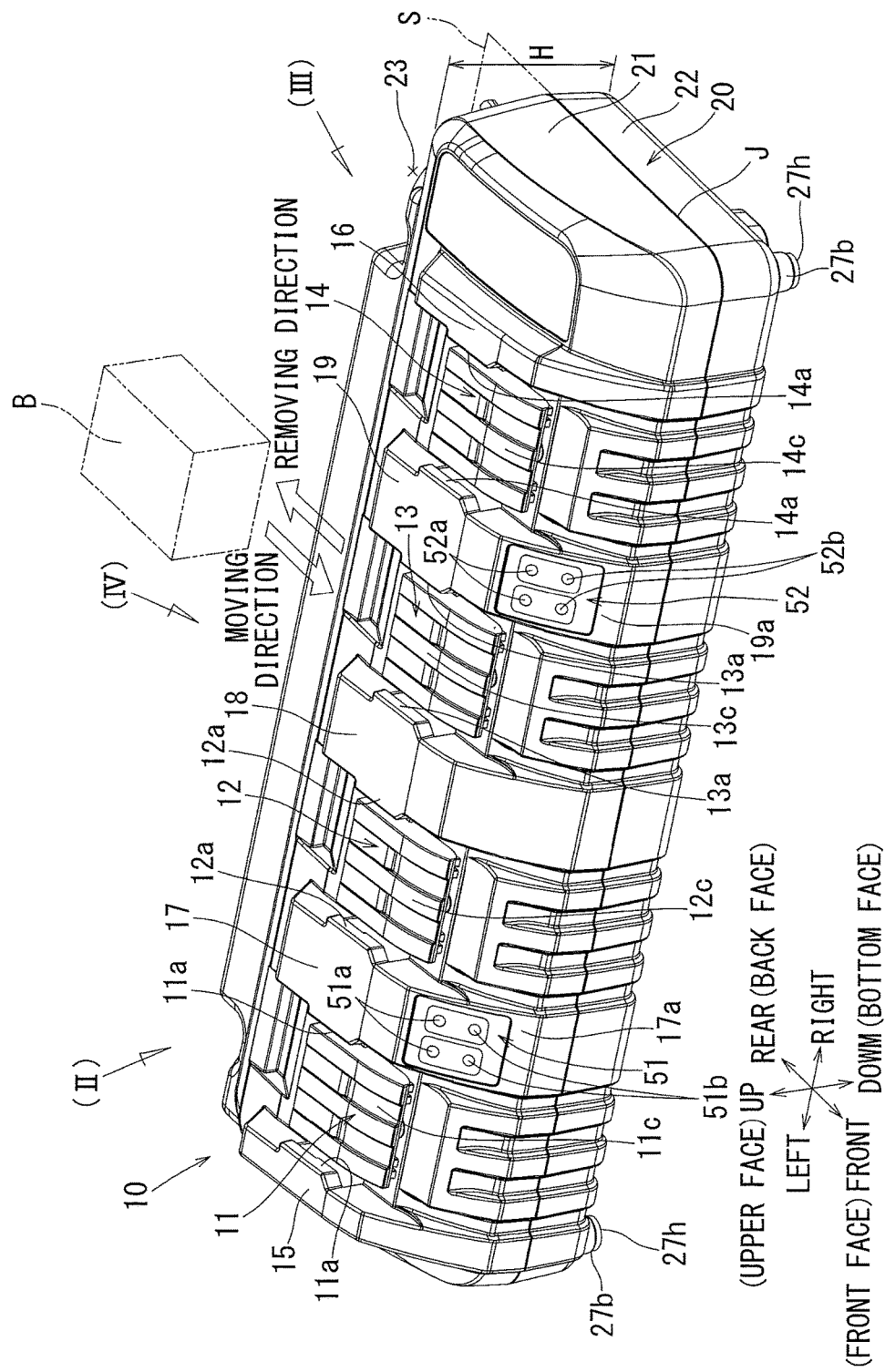
FIG. 1 is an overall perspective view when a charger according to an embodiment is viewed from an obliquely upper right side.
Figure 2:
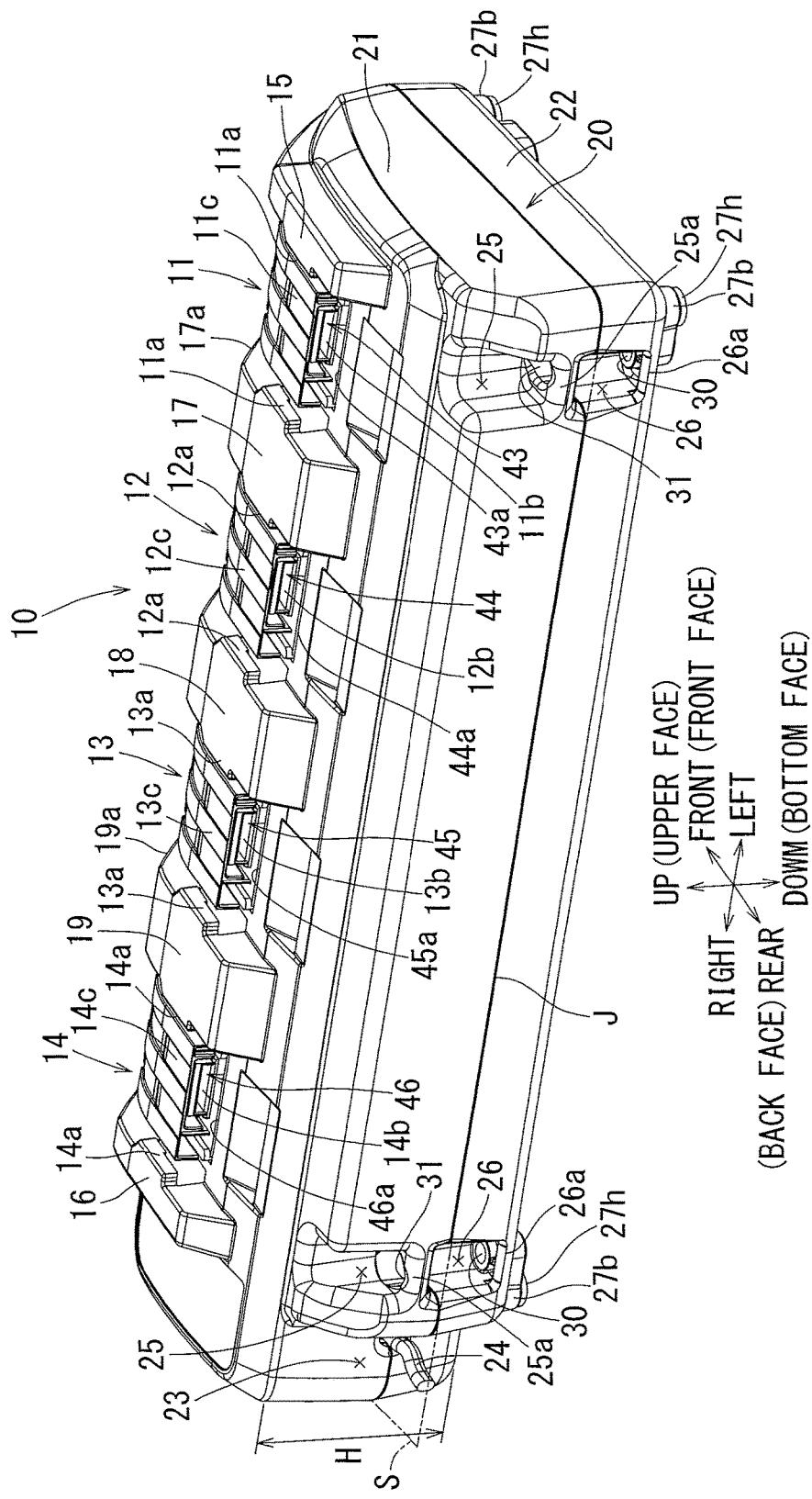
FIG. 2 is an overall perspective view when the charger according to an embodiment is viewed in an arrow (II) direction of FIG. 1 and the rear surface side of the charger is viewed from an obliquely upper left side.
Figure 3:
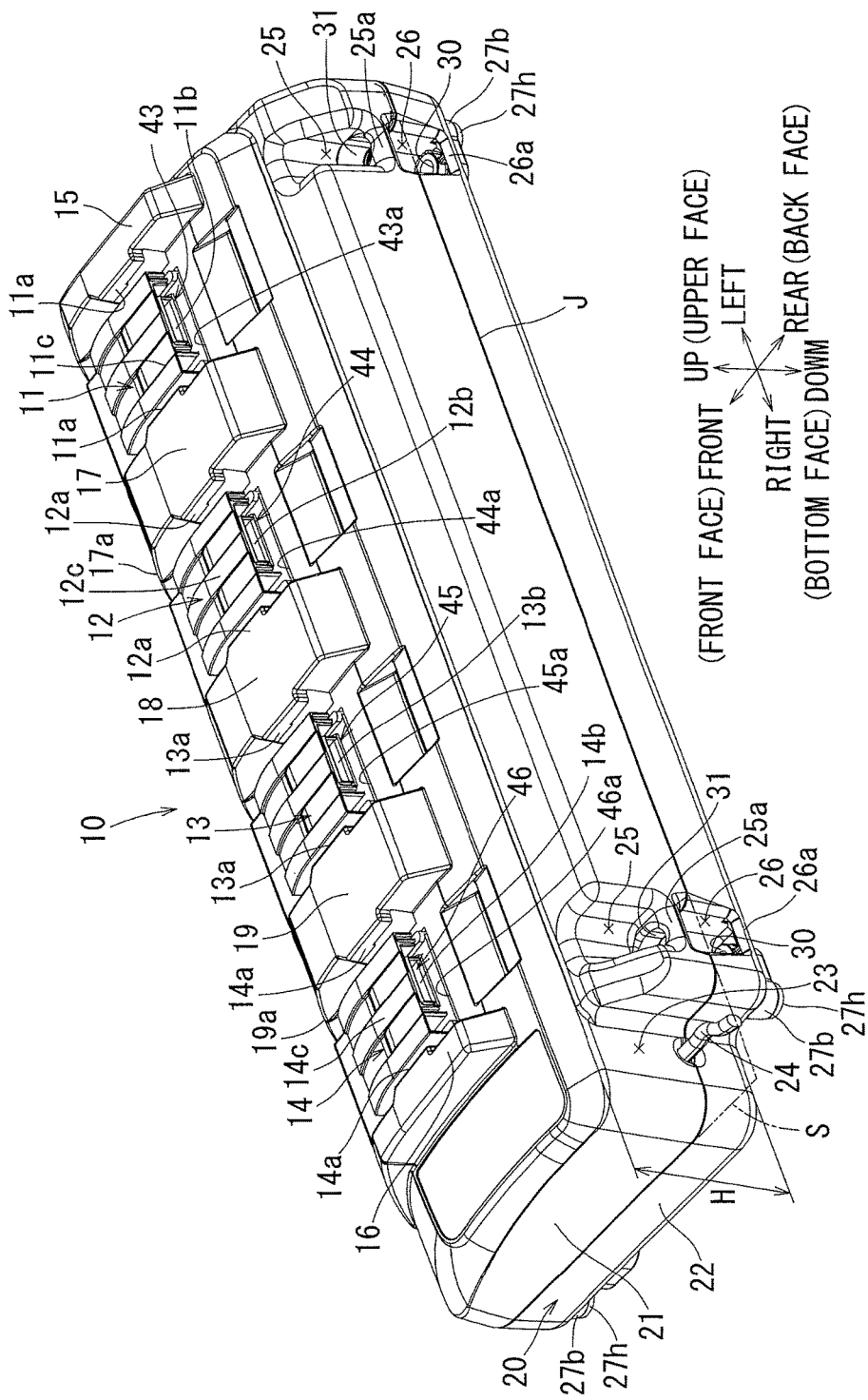
FIG. 3 is an overall perspective view when the charger according to an embodiment is viewed in an arrow (III) direction of FIG. 1 and the rear surface side of the charger is viewed from an obliquely upper right side.

As shown in FIG. 1, battery attachment portions 11 to 14 which include four ports are disposed on the upper surface of the charger 10 in parallel in a right-left direction. Each of the pairs of right and left receiving rail portions 11a and 11a to 14a and 14a is provided on each of the battery attachment portions 11 to 14. When the battery pack B slides from the rear surface side to the front surface side with respect to each of the battery attachment portions 11 to 14 in a state where the slide rails Bd, Bd are engaged with respect to each of the right and left receiving rail portions 11a and 11a to 14a and 14a, the battery pack B can be attached, and when the battery pack B slides in the opposite direction, the battery pack can be detached. The details of each of the battery attachment portions 11 to 14 will be described below.

Figure 4:
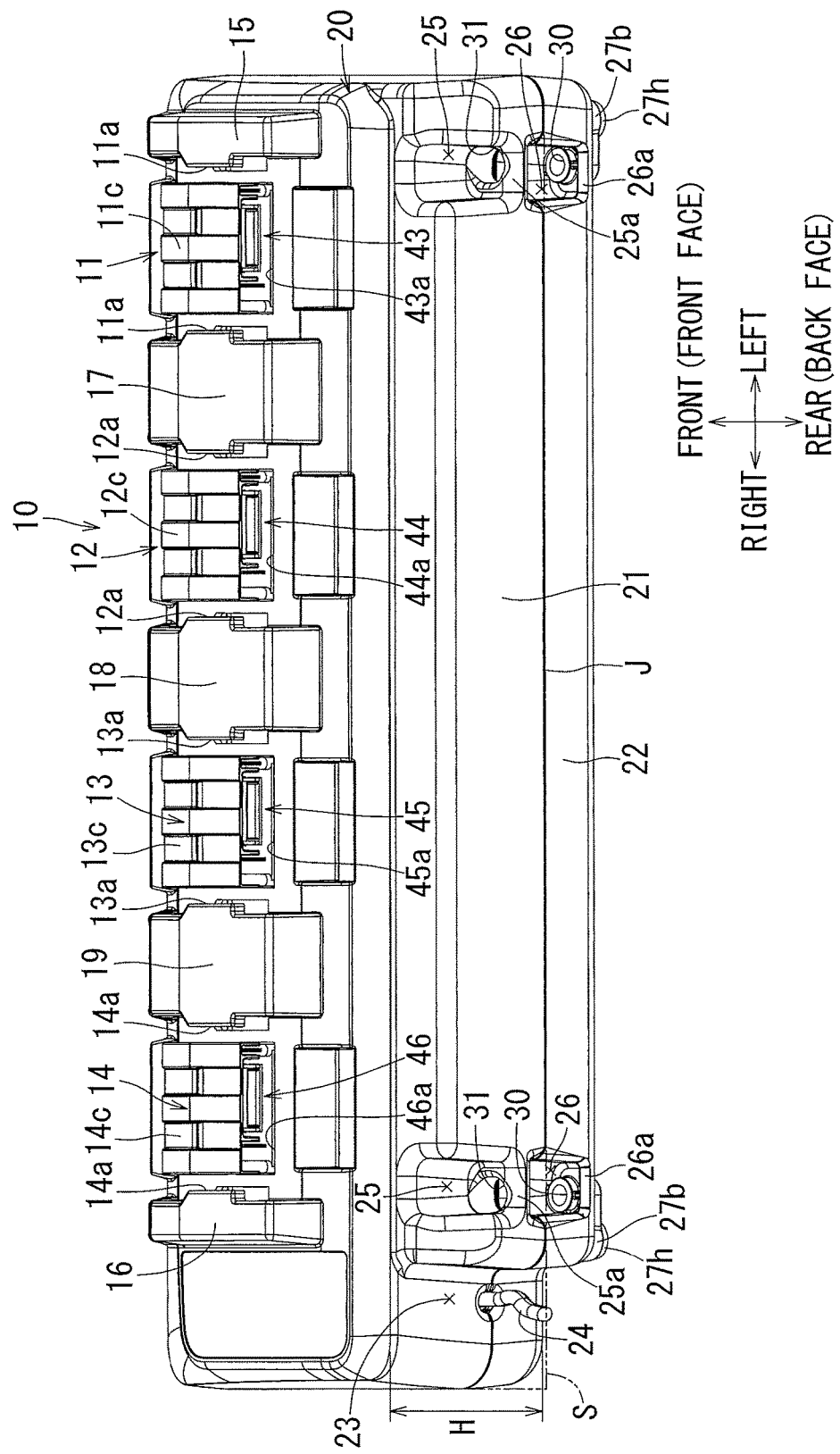
FIG. 4 is an overall perspective view when the charger according to an embodiment is viewed in an arrow (IV) direction of FIG. 1 and the rear surface side of the charger is viewed from an obliquely upper side.
Figure 5:
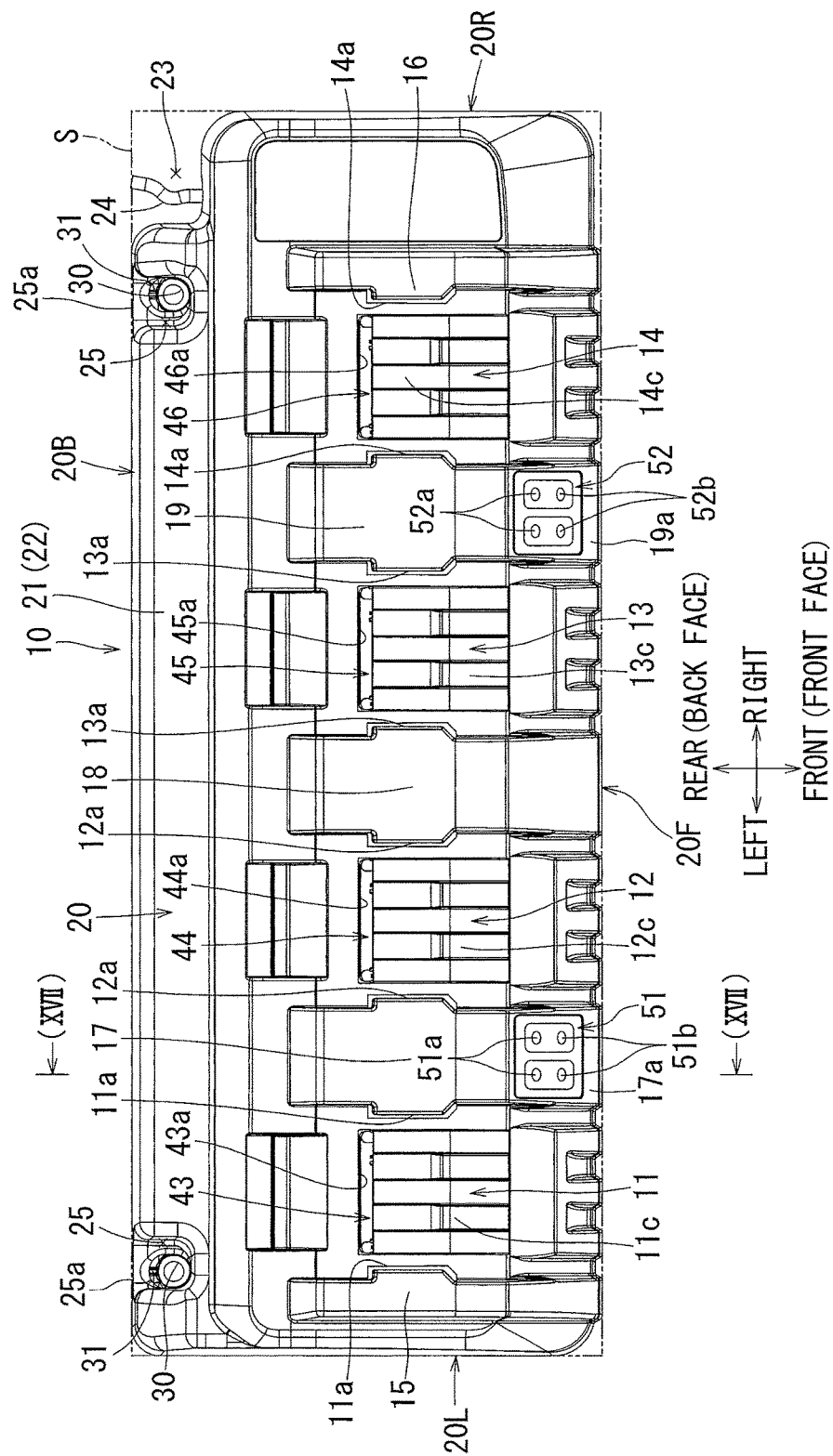
FIG. 5 is an overall plan view of the charger according to an embodiment.

Various methods with respect to the four-port type charger 10 of the present embodiment are performed. Hereinafter, this will be sequentially described. First, the charger 10 includes a main body housing 20 that has a rectangular shape in a planar view as shown in FIG. 5. In addition, as shown in FIGS. 1 to 4, the main body housing 20 has a two-piece structure in which the main body housing is divided into two in the height direction, and in which an upper divided housing 21 positioned at the upper portion of the main body housing and a lower divided housing 22 positioned at the lower portion of the main body housing are abutted against each other. In the drawings, a reference numeral J is assigned to an abutting surface (joining surface) between the upper divided housing 21 and the lower divided housing 22.

Figure 8:
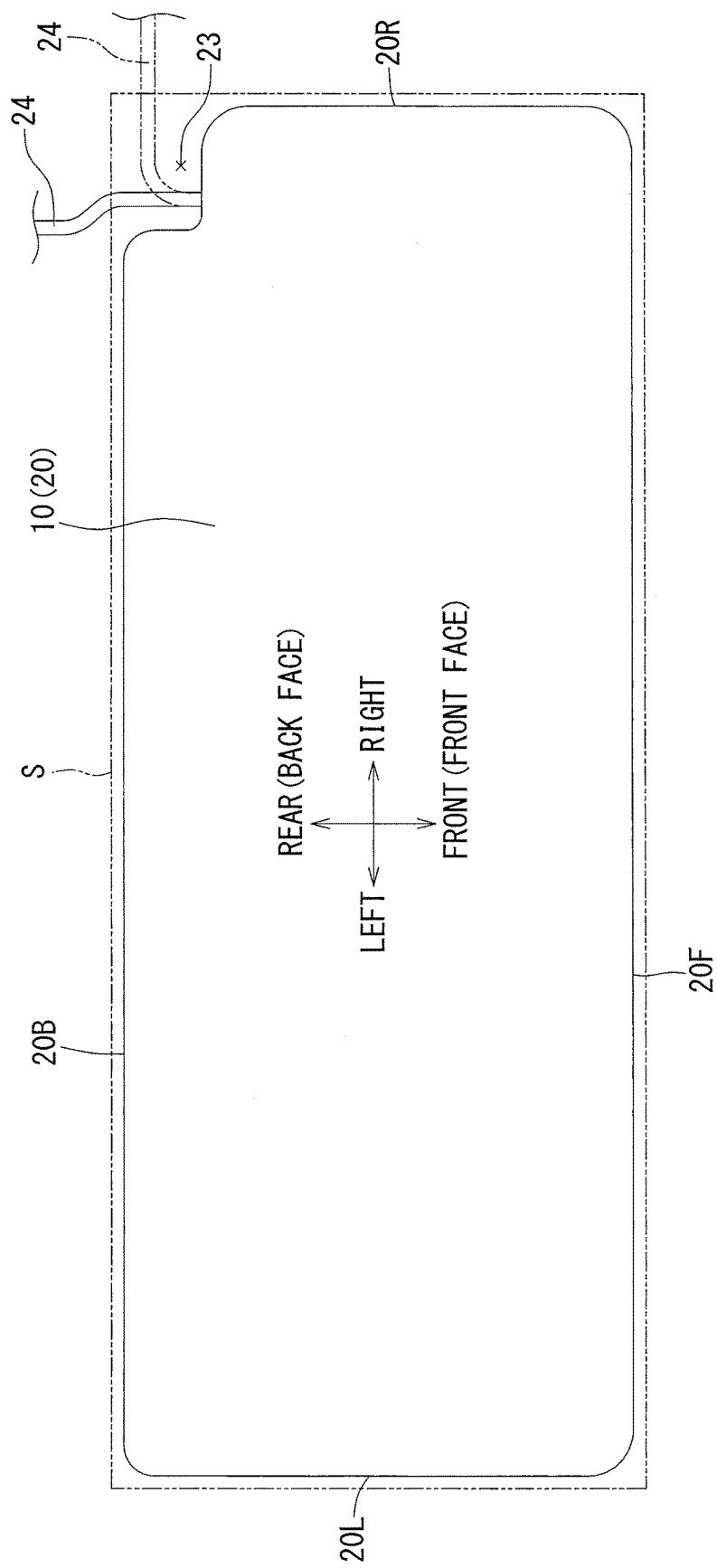
FIG. 8 is a plan view showing a side area in a planar view of the charger according to an embodiment.
Figure 9:
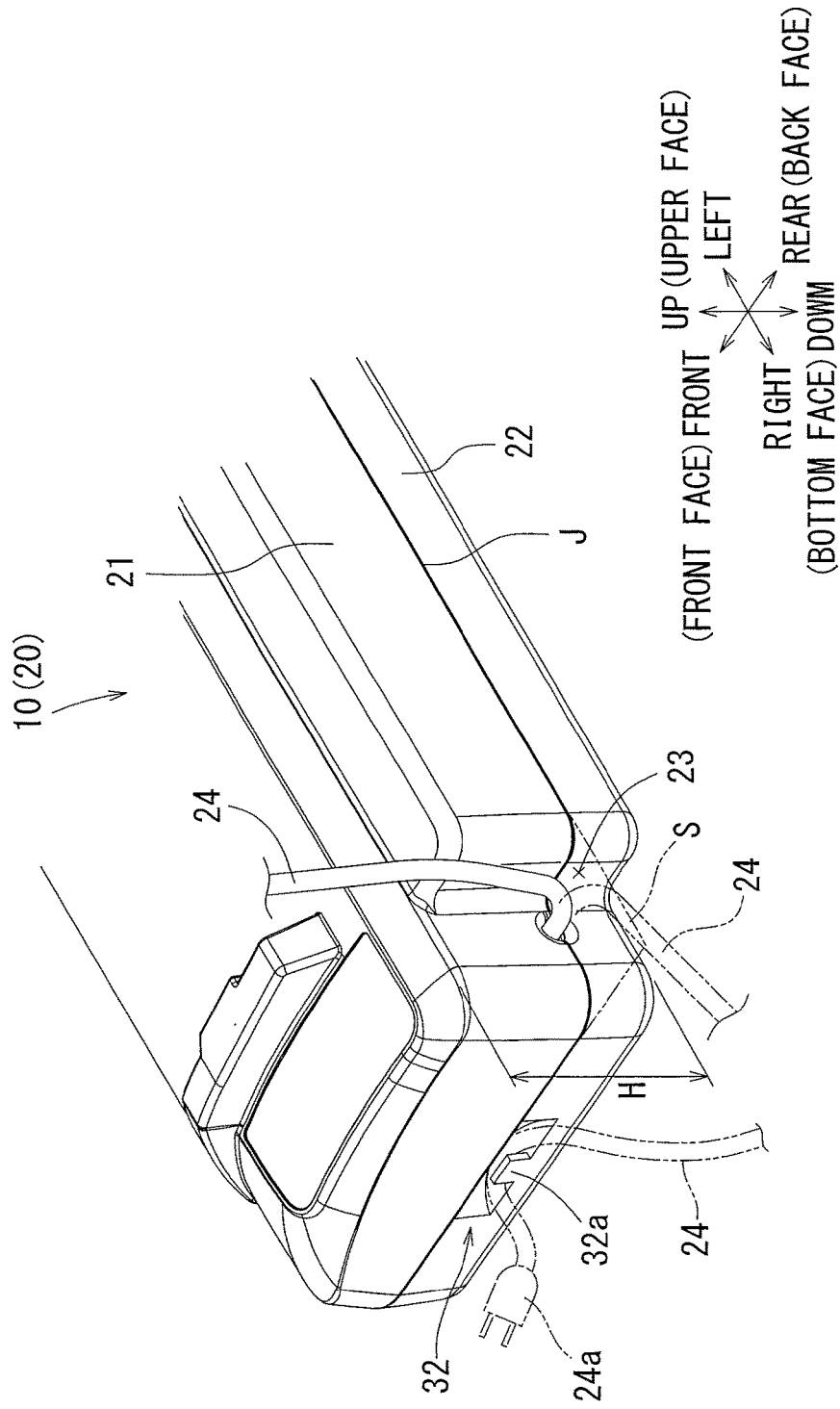
FIG. 9 is a perspective view of a recessed portion on a rear surface side and a right end of a main body housing.

A recessed portion 23 is provided on the rear-surface-side right end of the main body housing 20. And, the recessed portion includes cut-off corners, and it is recessed to both the rear surface and the right surface and has an approximately rectangular shape in a planar view. As shown in FIGS. 5 and 8 in which the charger 10 is shown in a planar view, when a side area S in a planar view is considered, which is surrounded by a line (an envelope curve and a line passing through the vicinity of the joining surface J in the present embodiment) passing through portions which protrude furthest to each side surface of a front surface 20F, a rear surface 20B, a right surface 20R, and a left surface 20L of the main body housing 20, the recessed portion 23 is provided inside the side area S in a planar view. As shown in FIGS. 2 to 4, and 9, the recessed portion 23 is provided over the entire area (the entire height H) in a height direction of the main body housing 20. Accordingly, the recessed portion 23 is provided to be open not only toward the rear side and the right side but also toward the upper side and the lower side. A power source cord 24 is drawn out from the inner portion of the recessed portion 23. The power source cord 24 can be drawn out from the inner portion of the recessed portion 23 to any one of the rear side or the right side, and as shown in FIG. 9, can be also drawn out to the upper side and the lower side.

In this way, since the power source cord 24 is drawn out from the inner portion of the recessed portion 23 which is recessed to the inside from the side area S in a planar view of the main body housing 20, when the rear surface of the charger 10 is mounted to abut a wall or the right surface is mounted to abut a wall, the rear surface or the right surface can be mounted to closely abut the wall without being obstructed by the power source cord 24. In addition, also in the situation where both the rear surface and the right surface of the charger 10 are mounted to simultaneously abut a corner portion of a wall, as shown in FIG. 9, the power source cord 24 can be drawn out from the recessed portion 23 to the upper side or the lower side. Accordingly, also in this case, the charger 10 can be mounted to closely abut the corner portion of the wall without being obstructed by the power source cord 24.

Moreover, although it is shown in only FIG. 9, a cord holding portion 32 for holding the power source cord 24 in place is provided on the right surface of the main body housing 20. The cord holding portion 32 is indented towards the inside from the side area S in a planar view. A hooking claw portion 32a is provided on the center of the cord holding portion 32. As shown in FIG. 9 by a two-dot chain line, the vicinity of an insertion plug 24a of the power source cord 24 is inserted into the cord holding portion 32 and is hooked by the hooking claw portion 32a, and thus, the insertion plug 24a can be held on the right portion of the main body housing 20. Accordingly, when the charger 10 is carried or the like, the charger 10 can be carried in a state where the insertion plug 24a is held on the right portion of the main body housing 20 without the power source cord 24 swinging, and when the charger is used the next time, the insertion plug 24a can be rapidly inserted into and connected to a socket.

According to the above-described configuration, the recessed portion 23 is provided on the-rear-surface right corner of the main body housing 20 over the entire area in the height direction. The recessed portion 23 is cut off from the-rear-surface right corner of the side area S in a planar view of the main body housing 20, and is indented in a rectangular shape inside the side area S. The recessed portion 23 is provided to be open in at least two directions (four directions including up and down directions in the present embodiment) such as the rear surface side and the right side. The power source cord 24 is drawn out from the inner portion of the recessed portion 23.

Accordingly, the power source cord 24 is led out in at least two directions (four directions including up and down directions in the present embodiment) such as the rear surface side and the right side from the inner portion of the recessed portion 23 and the power source cord can be wired. Therefore, for example, the charger 10 can be mounted in the state where the rear surface of the main body housing 20 closely abuts the wall surface without being obstructed by the power source cord 24 or in the state where the right surface closely abuts the wall surface.

Even when the charger 10 is mounted in a state where the main body housing 20 closely abuts the wall surface without a gap, since the charger is not obstructed by the power source cord 24, a mounting space of the charger 10 can be made more compact (the charger can be mounted even in a narrow space).

Moreover, since the exemplified recessed portion 23 is formed over the entire area in the height direction of the main body housing 20, the power source cord 24 can be drawn to the upper portion or to the lower portion (bottom surface 27 side) and be connected to the socket without protruding from the side area S in a planar view of the main body housing 20. Accordingly, the charger 10 can be mounted in the state where both the rear surface and the right surface of the main body housing 20 closely abut the corner portion of the wall surface without being obstructed by the power source cord 24. In this regard, the mounting space of the charger 10 can be made more compact, and usability of the charger 10 can be further increased.

Various modifications can be applied to the above-described configuration. For example, with respect to the position at which the recessed portion 23 is provided, the recessed portion may be provided at the-rear-surface left corner instead of the exemplified rear-surface right corner, or the position of the recessed portion is not limited to a corner and the recessed portion may be provided at the center of the right and left surfaces or at the center of the rear surface.

Even when the recessed portion is provided at any position and any surface of four surfaces of the front, rear, right, left surfaces of the main body housing 20 abuts the wall surface and is mounted, the charger is not obstructed by the power source cord, and thus, the charger can be mounted in the state where the main body housing closely abuts the wall surface without a gap.

In addition, the recessed portion 23 which is indented in a rectangular shape is exemplified. However, a recessed portion, which is inclined to two side surfaces of the main body housing (the side area S in a planar view) orthogonal to each other and has a corner-chamfered shape, may be provided.

Moreover, the recessed portion 23 which is provided over the entire area in the height direction of the main body housing 20 is exemplified. However, a recessed portion which is opened to only one side (one of the upper side or the lower side) in the height direction may be provided. For example, the recessed portion may be provided inside the side area S in a planar view only in the lower divided housing 22, and the power source cord may be drawn out from the recessed portion. In this case, the upper portion of the recessed portion is blocked by the corner of the upper divided housing. However, the power source cord is positioned toward the bottom surface side and can be connected even when the corner abuts the wall surface corner portion, and thus, similarly, the mounting space can be made compact.

The above-described configuration can be understood by the following first to fourth related embodiments.

According to the first related embodiment, there is provided a charger in which a recessed portion which is recessed inside a side area in a planar view of a main body housing is provided on a side portion of the main body housing and a power source cord is drawn out from the recessed portion, in which the recessed portion is open in at least two directions different from each other, and the direction in which the power source cord is drawn out from the plane side surface area can be changed to any one of at least two directions.

According to the first related embodiment, since the power source cord is drawn out from the recessed portion, when any one of two side surfaces abuts a wall (to a wall) without a gap and is mounted, the power source cord can be drawn out from the other side surface side. Accordingly, one side surface closely abuts the wall and the charger can be mounted onto the wall without being obstructed by the power source cord.

Moreover, the charger can be mounted in the state where the charger abuts the wall without being obstructed by the power source cord, and thus, the mounting space of the charger can be made compact.

According to the second related embodiment, in the first related embodiment, the recessed portion is provided on a corner of two side surfaces of the main body housing intersecting each other.

According to the second related embodiment, the recessed portion is provided on two side surfaces intersecting each other, for example, on an intersection portion (corner) between the rear surface and the right surface, and thus, an electric cord can be drawn out to any one of the rear side or the right side. Accordingly, when the charger is mounted in the state where the rear surface of the main body housing abuts the wall surface, the power source cord can be drawn out to the right side from the recessed portion, and when the charger is mounted in the state where the right surface abuts the wall surface, the power source cord can be drawn out to the rear side from the recessed portion. In any case, the main body housing can be mounted such that it abuts the wall surface without being obstructed by the power source cord.

According to the third related embodiment, in the first or second related embodiment, the recessed portion is open to the upper side in the height direction of the main body housing.

According to the third related embodiment, the power source cord can be drawn out to the upper side from the recessed portion. Accordingly, the charger can be mounted in a state where the charger closely abuts the corner portion of the wall without being obstructed by the power source cord, for example, in a state where the rear surface and the right surface of the main body housing abut the wall surface.

According to the fourth related embodiment, in any one of the first to third related embodiments, the recessed portion is provided over the entire area in the height direction of the main body housing and is open in both directions of the up and down directions in the height direction.

According to the fourth related embodiment, since the recessed portion is provided over the entire area in the height direction, the power source cord can be drawn out to any one of the upper side or the lower side from the recessed portion. Accordingly, when two side surfaces (for example, rear surface and right surface) of the main body housing abut the wall together and the charger is mounted on the corner portion of the wall, the power source cord can be drawn out from any one of the upper side and the lower side of the recessed portion and can be connected to the power source socket. In this regard, the mounting space of the charger is compact and the handling of the power source cord is convenient, and usability of the charger can be improved.

Figure 11:
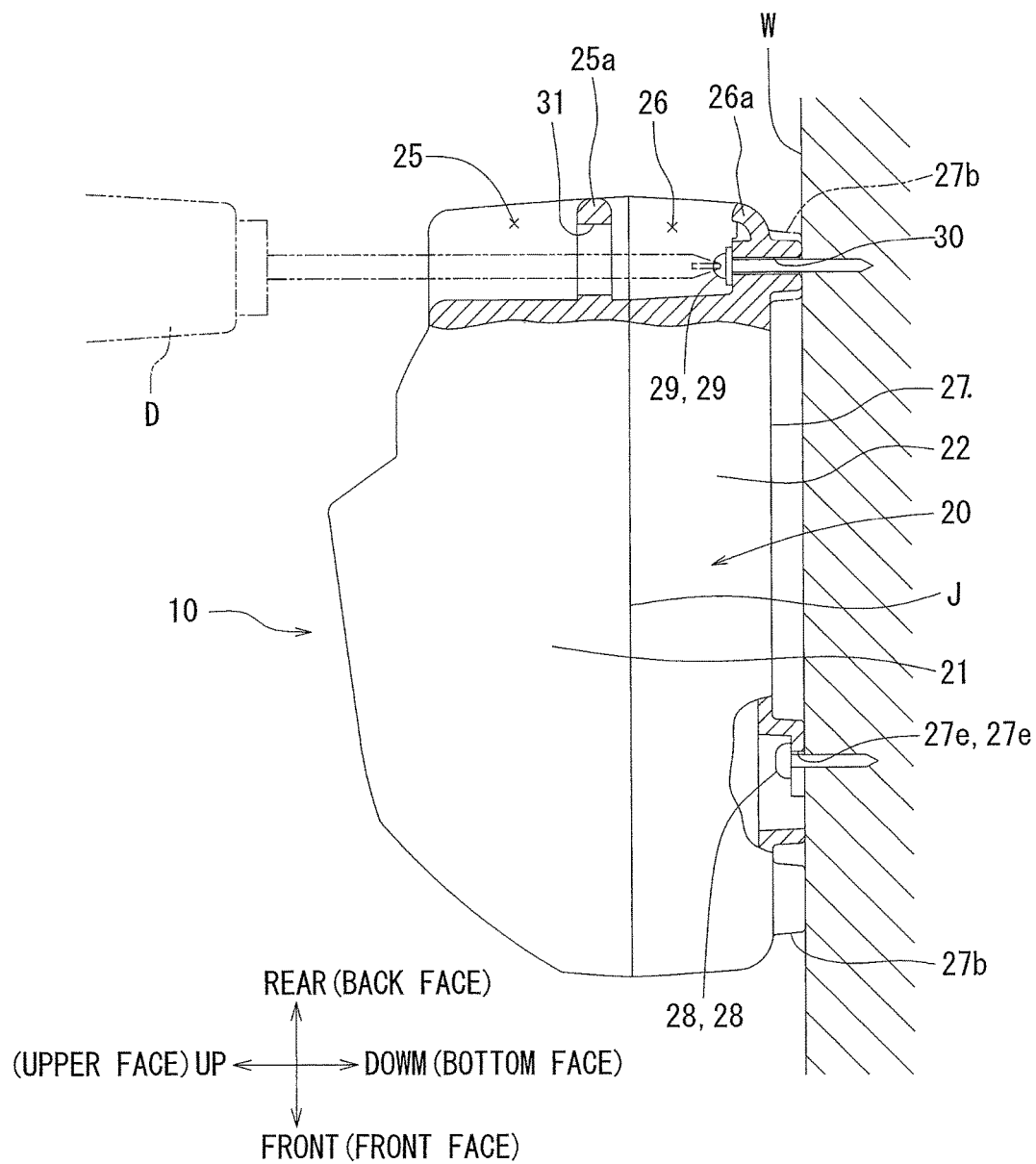
FIG. 11 is a schematic view when the charger mounted in a wall-hanging state is viewed from the right surface side.
Figure 12:
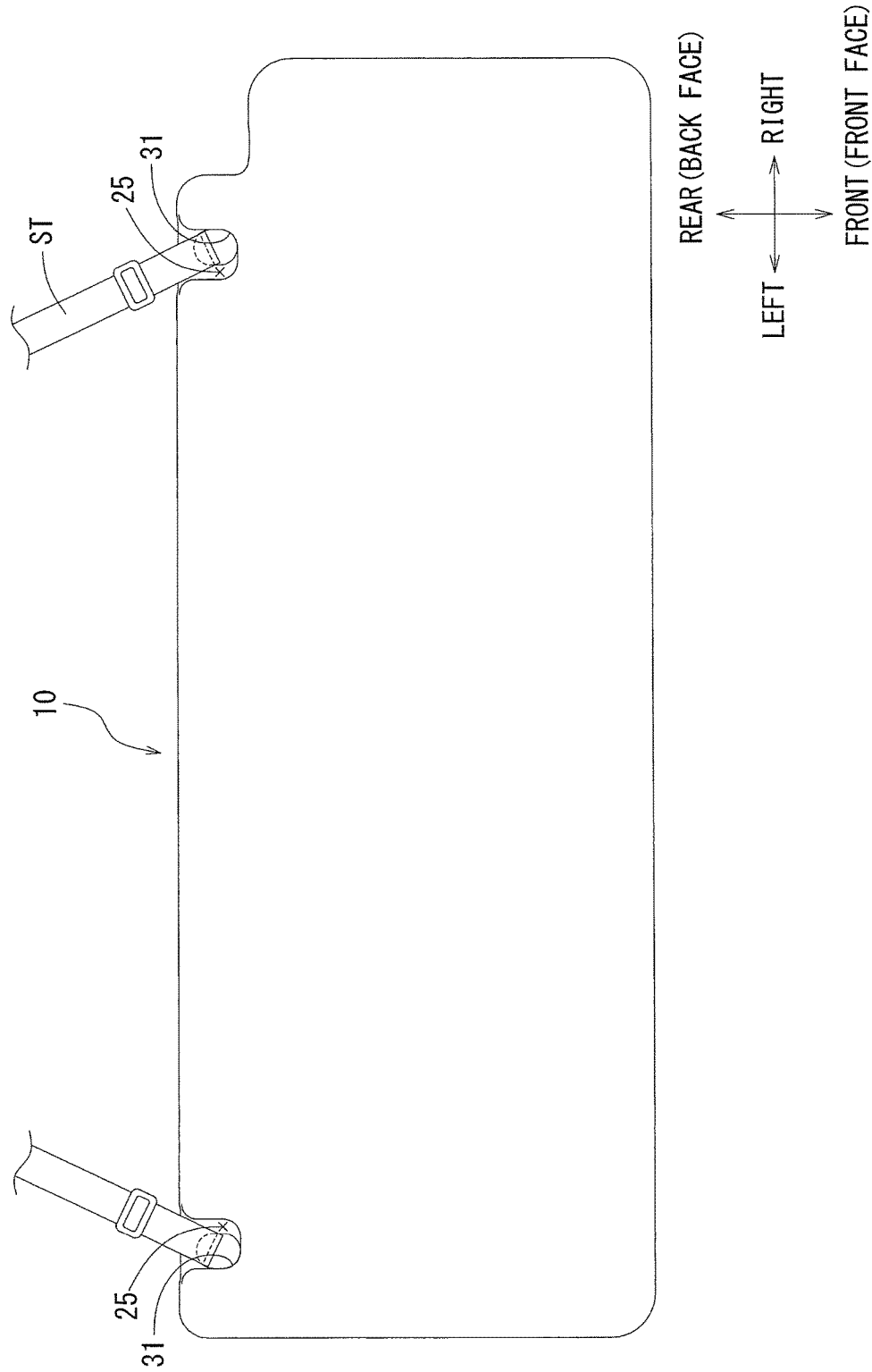
FIG. 12 is a plan view of the charger in a state where a strap for carrying on the shoulder is attached.

Next, the charger 10 according to the present embodiment is not limited to the state where the charger is mounted onto a worktable. For example, as shown in FIG. 11, the charger can be mounted to have a wall-hanging state. Moreover, the charger 10 according to the present embodiment can be directly carried by hand, or, for example, as shown in FIG. 12, a strap ST is put on a shoulder to carry the charger.

As shown in FIGS. 2 to 5, a pair of right and left wall-hanging fixing holes 30 and 30 and, similarly, a pair of right and left strap attachment holes 31 and 31 are provided on the rear surface of the main body housing 20. As shown in the drawings, the wall-hanging fixing holes 30 and 30 and the strap attachment holes 31 and 31 are provided at positions further inside from the side area S in a planar view and do not protrude to the sides.

Recessed portions 25 and 26, which are formed vertically in two steps, are provided to be paired in right and left pairs on the rear surface of the main body housing 20 and inside the side area S in a planar view. The upper recessed portions 25 and 25 positioned at the upper portion of the main body housing are provided on the upper divided housing 21, and the lower recessed portion 26 and 26 positioned at the lower portion of the main body housing are provided on the lower divided housing 22. The strap attachment hole 31 is provided on each of the bottom edge portions 25a and 25a of the upper recessed portions 25 and 25 in a state where the hole 31 penetrates the edge portion 25a. As shown in FIG. 5, each of the right and left strap attachment holes 31 and 31 is formed in a long groove hole shape which is slightly longer in a front-rear direction (up-down direction in FIG. 5).

In addition, as shown in FIG. 5, the right and left strap attachment holes 31 and 31 are disposed to be slightly deviated to a side (the outer side in the right-left direction) and separated from each other from the center in the right-left direction of the bottom edge portion 25a. Accordingly, the left strap attachment hole 31 is disposed to be deviated to the left end of the bottom edge portion 25a of the upper recessed portion 25, and the right strap attachment hole 31 is disposed to be deviated to the right end of the bottom edge portion 25a of the upper recessed portion 25. In this way, since the right and left strap attachment holes 31 and 31 are disposed to be separated from each other with respect to the upper recessed portion 25, as shown in FIG. 12, in the state where the strap ST is hung between both strap attachment holes 31 and 31, the strap ST does not easily abut the inner ends of both upper recessed portions 25 and 25 (the left end of the right upper recessed portion 25 and the right end of the left upper recessed portion 25). The strap ST is hung between the right and left strap attachment holes 31 and 31 provided in this way, and thus, a user puts the strap on his or her shoulder and can carry the charger 10.

According to the charger 10 of the present embodiment configured as described, since the strap attachment holes 31 and 31 for attaching the strap ST for carrying on the shoulder are provided in the state where the holes do not protrude to the side portions of the main body housing 20, when the charger 10 is accidentally hit by other members or when the charger 10 is accidentally dropped, damage thereto is prevented, and thus, the durability of the charger 10 can be increased.

In addition, since the strap attachment holes 31 and 31 are provided on the bottom portions 25a and 25a of the upper recessed portions 25 and 25 provided on the rear surface of the main body housing 20, if the strap ST is detached, the charger can be mounted in the state where the rear surface of the main body housing 20 closely abuts the wall without a gap, and accordingly, the mounting space can be made compact.

Moreover, the right and left strap attachment holes 31 and 31 are disposed to be deviated to the side and separated from each other with respect to the center in the right and left width direction of the bottom edge portions 25a and 25a. Accordingly, in the state where the strap ST attached to both strap attachment holes 31 and 31 is hung on a shoulder, the strap ST is inclined in a mountain shape toward the shoulder and does not easily come into contact with the wall portions inside the upper recessed portions 25 and 25, the strap ST can be attached with good right and left balance, and damage due to rubbing of the strap ST to the main body housing 20 (the inner wall portion of the upper recessed portion 25) can be reduced.

In addition, since the bottom edge portions 25a and 25a for attaching the strap ST do not have the upper and lower two-piece structures which are butted to each other at the joining surface J, and are configured to be integrally provided on the upper divided housing 21 side, even when the main body housing 20 is divided into the upper divided housing 21 and the lower divided housing 22, the bottom edge portions 25a and 25a are not divided into two in the plate thickness direction. Accordingly, the plate thickness can be thinned while securing strength of the bottom edge portions 25a and 25a, and since the bottom edge portions are not divided into two, misalignment of the strap attachment holes 31 and 31 does not occur.

Various modifications can be applied to the exemplified embodiment. For example, the configuration in which the strap attachment holes 31 and 31 are provided on the rear surface side of the main body housing 20 is exemplified. However, the strap attachment holes may be provided on the right and left portions.

In addition, the configuration in which the pair of right and left strap attachment holes 31 and 31 is provided is exemplified. However, a configuration in which the strap is attached to one strap attachment hole to be hung on a shoulder may be adopted.

In addition, the configuration is exemplified in which the right and left strap attachment holes 31 and 31 are disposed to be deviated to the side separated from each other with respect to each of the bottom edge portions 25a and 25a. A configuration may be adopted in which each of the right and left strap attachment holes is disposed at the center in the right and left width direction of the bottom edge portions 25a and 25a.

Moreover, each of the strap attachment holes 31 and 31 is not limited to the exemplified long groove hole, and may be a circular through-hole.

In addition, a configuration which has both the function of the fixing holes 30 and 30 for being mounted on the worktable and the function of the strap attachment hole may be adopted.

The above-described configurations can be understood by the following fifth to seventh related embodiments.

According to the fifth related embodiment, there is provided a charger in which a strap for carrying on the shoulder can be attached and a strap attachment hole is provided inside a side area in a planar view of a main body housing.

According to the fifth related embodiment, since the attachment hole for attaching the strap is provided in a state where the hole does not protrude to the side portion of the main body housing, when the charger is accidentally hit by other members, or when the charger 10 accidentally drops or the like, durability of the main body housing can be increased.

Moreover, since the attachment hole for attaching the strap is provided in a state where the hole does not protrude to the side portion of the main body housing, the charger can be mounted in a state where the side portion of the main body housing closely abuts a wall without a gap, and thus, a mounting space can be made compact.

According to the sixth related embodiment, in the fifth related embodiment, a pair of right and left strap attachment holes are provided, and both attachment holes are provided to penetrate a bottom edge portion of a recessed portion which is recessed to the inside from the side area in a planar view. Further, both attachment holes are provided to be deviated to a side separated from each other with respect to a center in a right-left direction of the bottom edge portion in a planar view.

According to the sixth related embodiment, when one end side and the other end side of the strap are hooked to the right and left strap attachment holes, the strap hung to be inclined to the side approaching each other does not easily come into contact with a wall portion inside the recessed portion, and thus, the strap can be attached with good right and left balance.

According to the seventh related embodiment, in the sixth related embodiment, the main body housing has a two-piece structure in which a lower divided housing provided on an mounting surface side and an upper divided housing having a battery pack attachment portion are butted to each other at a joining surface along the mounting surface, and the bottom edge portion is not provided on the joining surface and is provided in one of the lower divided housing and the upper divided housing.

According to the seventh related embodiment, since the joining surface is not set to the bottom edge portion in which the strap attachment hole is provided, strength of the bottom edge portion is easily secured, and vertical misalignment with respect to the strap attachment holes does not occur.

Moreover, as shown in FIG. 5, the position in the right-left direction of each of the fixing holes 30 and 30 is disposed to be coincident with (be coaxial with) the lower portion of each of the right and left strap attachment holes 31 and 31. Accordingly, in FIG. 5, the fixing holes 30 and 30 of the lower portion can be seen via the right and left strap attachment holes 31 and 31.

The right and left fixing holes 30 and 30 are also disposed to be slightly deviated to the side (the outer side in the right-left direction) separated from each other from the center in the right-left direction of the bottom edge portions 26a and 26a of the lower recessed portions 26 and 26. Accordingly, as shown in FIG. 4, the left fixing hole 30 is disposed to be deviated to the left end of the bottom edge portion 26a of the lower recessed portion 26, and the right fixing hole 30 is disposed to be deviated to the right end of the bottom edge portion 26a of the lower recessed portion 26.

Figure 10:
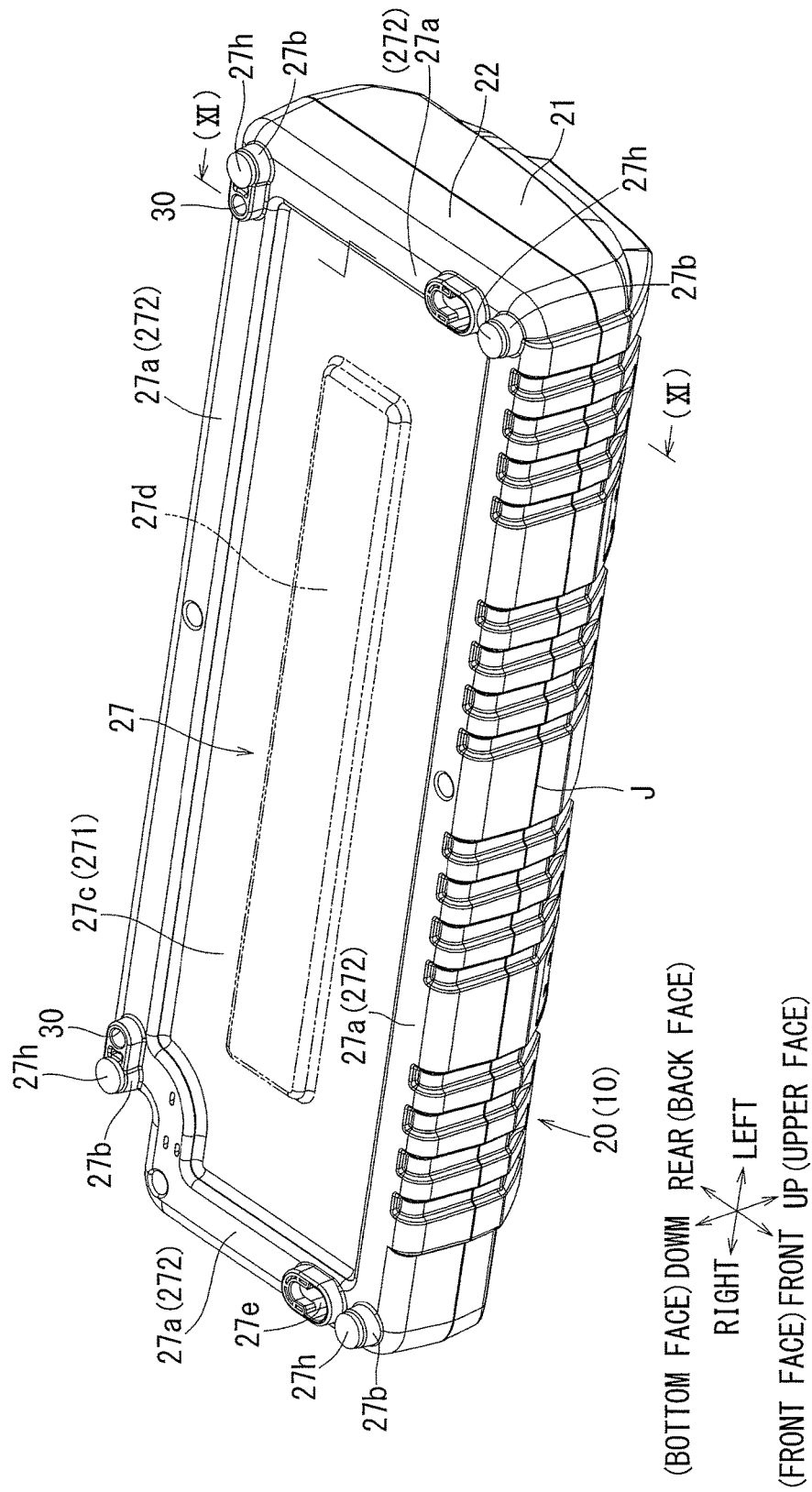
FIG. 10 is a perspective view when the charger according to an embodiment is flipped upside down and the bottom surface side is directed upward.

Each of the right and left fixing holes 30 and 30 is provided to vertically penetrate the bottom edge portion 26a. Therefore, both fixing holes 30 and 30 are provided to be open to the bottom surface 27 side of the main body housing 20 on the bottom surface side of the lower divided housing 22. FIG. 10 shows a state in which the main body housing 20 is viewed from the bottom surface 27 side. Legs 27b to 27b are provided on four corners of the bottom surface 27 of the main body housing 20. An anti-slipping rubber plate 27h is attached to each leg 27b. The fixing holes 30 are open to the inner sides of two right and left legs 27b and 27b of the rear surface side. Hook portions 27e and 27e having a tumbler-shaped hole shape are provided on the rear surface side (the upper side in FIG. 10) of two right and left legs 27b and 27b of the front surface side. As shown in FIG. 11, when the charger 10 is mounted to be in a wall-hanging state, the bottom surface 27 opposes a wall surface W, engagement convex portions 28 and 28 provided on the wall surface are hooked to both hook portions 27e and 27e, fixing screws 29 and 29 are inserted into both fixing holes 30 and 30 in the hooked state and are fastened to the wall surface W, and thus, the charger 10 can be fixed in a wall-hanging state. Moreover, when the charger is mounted to be in a wall-hanging state as shown in the figures, the rubber plate 27h of each leg 27b has been detached in advance.

In this case, since the strap attachment hole 31 is disposed to be coaxial with the fixing hole 30, as shown in FIG. 11, for example, a screwdriver D for fastening a screw can be inserted into the strap attachment hole 31 via the upper recessed portion 25 to fasten the fixing screw 29, and thus, the fastening operation can be easily performed.

As shown in FIG. 10, the bottom surface 27 of the main body housing 20 becomes a case bottom portion of the main body housing 20 when the charger 10 is disposed and functions as a seat which supports various charger function parts (device bodies) which are installed in the inner portion of the main body housing 20. The charger function parts are supported by a bottom center portion 271 which is set to an approximately center area of the bottom surface. Meanwhile, the surrounding of the bottom center portion 271 including the circumference of the bottom surface 27 is set to bottom circumferential portions 272 to 272. In the bottom surface 27 in which the area is divided in this way, finger hooks 27a to 27a are provided on all bottom circumferential portions 272 to 272 which become two sides or more among four sides configuring the bottom circumferential portions 272 to 272.

That is, the finger hooks 27a to 27a are provided over the entire circumference of the bottom circumferential portions 272 to 272 which are set as the periphery along four of front, rear, right, and left sides in the bottom surface 27. Compared to the shape which is set for the bottom center portion 271 set at the approximately center area, the finger hooks 27a to 27a are formed to protrude to the outside with respect to the bottom circumferential portions 272 to 272. Specifically, the finger hooks 27a to 27a are formed one step higher than the bottom center portion 271. In this way, compared to the bottom center portion 271, due to the finger hooks 27a to 27a, efficiency in the hooking of fingers of the user with respect to the entire circumference of four sides configuring the bottom circumferential portions 272 to 272 is increased. That is, a fingertip of the user is hooked to the finger hooks 27a to 27a, the finger hooks 27a to 27a function as an anti-slipping portion, and thus, the charger 10 can be easily carried. In addition, the fingertip is hooked to the finger hooks 27a to 27a, and thus, the charger 10 can be securely carried with one hand.

Since the finger hooks 27a to 27a are provided over the entire circumference in the surrounding of the bottom surface 27, the fingertip of the user is hooked to any one of the front surface side, the rear surface side, or the right and left portion sides of the main body housing 20, and the charger 10 can be firmly held by the user. Accordingly, even when the user is a left-handed person or a right-handed person, the charger 10 can be easily carried with a dominant hand. The finger hook 27a is provided along all four sides of the bottom surface 27. In addition, the finger hook 27a may be provided on two sides in which one of the front surface side and the rear surface side and one of the right and left portions intersect each other, and thus, similar effects can be obtained.

A bottom surface recessed portion 27c which is one step lower than the finger hook is provided on the bottom center portion 271 which is set inside the finger hooks 27a to 27a. Since the space of the bottom surface recessed portion 27c is sufficient if a space sufficient to hook the finger of the user to the finger hook 27a is secured, preferably, the space of the bottom surface recessed portion is set to a narrow area as possible. Accordingly, as shown in FIG. 10 by a two-dot chain line, a center step portion 27d having the same height as the finger hooks 27a to 27a may be provided on the center of the bottom-surface recessed portion 27c provided on the bottom center portion 271. The center step portion 27d is formed to protrude toward the outside with respect to the main body housing 20. In this way, when the center step portion 27d is provided on the bottom surface recessed portion 27c, the recess range of the bottom surface recessed portion 27c can be decreased, and thus, the capacity of the inner portion of the main body housing 20 can be increased. That is, particularly, internal capacity (depth) of the lower divided housing 22 of the main body housing 20 can be increased. In this way, when the internal capacity of the main body housing 20 is increased by the accommodation expansion shape of the lower divided housing 22, for example, as described below, a degree of freedom of an electronic part layout on a control substrate 40 accommodated in the lower divided housing 22 can be increased. That is, the internal capacity of the main body housing 20 is expanded, and thus, the device body mounted in the inner portion of the main body housing 20 can be advantageously mounted.

According to the charger 10 configured as described above, since the finger hooks 27a to 27a are provided on four sides configuring the bottom circumferential portion 272 of the bottom surface 27, compared to the bottom center portion 271 of the bottom surface 27, efficiency in the hooking of the fingers of the user can be increased. Accordingly, when the user carries the charger 10, the user can easily hold the charger 10 in any one of all circumferential directions, the charger 10 can be firmly held by a hand through various holding methods when the charger 10 is carried, and convenience when the charger is carried can be improved. That is, even when the user simply holds the end edge portion of the charger 10 with a hand, a finger can be hooked to the finger hook 27a provided in the vicinity of the end edge of the charger 10, and thus, the charger 10 can be firmly held. Moreover, even when the user carries the charger 10 while holding the charger under his or her arm, fingers can be hooked to the finger hook 27a provided in the vicinity of the end edge of the charger 10, and the charger 10 can be firmly held. In addition, according to the above-described charger 10, compared to the bottom center portion 271, in the finger hooks 27a to 27a, efficiency in the hooking of fingers of the user is increased, and the shape of the bottom circumferential portion 272 is set to further protrude to the outside than the set shape of the bottom center portion 271. Thus, the finger hooks 27a to 27a can be simply and inexpensively provided.

Moreover, various modifications can be applied to the exemplified embodiment. For example, the exemplified finger hooks 27a to 27a are provided on four sides of the entire circumference configuring the bottom circumferential portion 272 of the bottom surface 27. However, finger hooks according to the following eighth to eleventh related embodiments may be provided on at least two sides of four sides of the entire circumference of the bottom circumferential portion. In the finger hooks according to the following eighth to eleventh related embodiments, an appropriate configuration may be selected if the configuration increases the efficiency in the hooking of fingers of the user. That is, in the finger hooks according to following eighth to eleventh related embodiments, the finger hooks may be a hook in which the efficiency in the hooking of fingers is increased by the exemplified structure, may be a hook in which the efficiency in the hooking of fingers is increased by a shape such as a finer projection, and may be a hook in which the efficiency in the hooking of fingers is increased by a material such as an elastic material. More specifically, in the finger hooks according to following eighth to eleventh related embodiments, a plurality of anti-slipping fine projections may be formed, or anti-slipping processing such as a knurling may be performed, or an elastic member such as anti-slipping rubber sheet may be adhered. Even when the finger hook is configured in this way, the ease with which the charger can be carried can be further improved.

In addition, in the above-described embodiment, the bottom center portion 271 may be formed as the bottom surface recessed portion 27c, or may be formed as the center step portion 27d, and an appropriate shape can be selected. However, when the bottom center portion 271 is formed as the center step portion 27d, since the internal capacity (depth) of the lower divided housing 22 can be increased and the internal capacity of the main body housing 20 can be expanded, the layout of the control substrate or the like accommodated in the main body housing 20 is advantageously performed.

The above-described configuration can be understood by the following eighth to eleventh related embodiments.

According to the eighth related embodiment, there is provided a charger which is configured to charge a chargeable type battery and has an exterior case configuring the exterior of the charger, in which an area of a bottom surface configuring a case bottom portion of the exterior case when the charger is disposed is divided into a bottom center portion supporting a device body mounted in the inner portion of the exterior case and a bottom circumferential portion set as the surrounding of the bottom center portion, and a finger hook which increases efficiency in hooking of fingers of a user compared to the bottom center portion is provided on the bottom circumferential portions of at least two sides among four sides configuring the bottom circumferential portions. According to the charger according to the eighth embodiment, since the finger hook is provided on the bottom circumferential portions of at least two sides among four sides configuring the bottom circumferential portion of the bottom surface, the efficiency in the hooking of fingers of the user can be increased compared to the bottom center portion of the bottom surface. Accordingly, when the user carries the charger, since the user can easily hold the charger from at least two directions, the charger can be firmly held by a hand through various holding methods when the charger is carried, and convenience when the charger is carried can be improved. In addition, as the carrying aspect of the charger, there is an aspect in which the end of the charger is simply held by a hand to carry, and in which the charger is held under the arm of a user to carry, or the like.

According to the ninth related embodiment, in the eighth related embodiment, in the finger hook, the shape of the bottom circumferential portion is configured to protrude further to the outside than the set shape of the bottom center portion, and the efficiency in the hooking of fingers of the user is increased compared to the bottom center portion. According to the charger of the ninth embodiment, in the finger hooks, the efficiency in the hooking of fingers of the user is increased compared to the bottom center portion, and the shape of the bottom circumference portion is configured to protrude further to the outside than the set shape of the bottom center portion. Thus, the finger hooks can be simply and inexpensively provided.

According to the charger of the tenth related embodiment, in the eighth or ninth related embodiment, the finger hook is provided over four sides configuring the entire circumference of the bottom circumferential portion. According to the charger of the tenth embodiment, since the finger hook is provided over four sides configuring the entire circumference of the bottom circumferential portion, when the user carries the charger, the user can hold the charger in any direction of the all circumferential directions. Accordingly, with respect to various carrying aspects, the charger is held by a hand in any direction, and thus, convenience at the time of carrying can be further improved.

According to the eleventh related embodiment, in any one of the eighth to tenth embodiments, an accommodation expansion shape which protrudes toward the outside of the exterior case and expands an internal capacity of the exterior case is provided on the bottom center portion. According to the charger of the eleventh embodiment, since the accommodation expansion shape protruding toward the outside of the exterior case is provided on the bottom center portion, the internal capacity of the exterior case can be expanded. Accordingly, the internal capacity of the exterior case is expanded, and thus, it is possible to advantageously install the device body which is mounted in the inner portion of the exterior case.

According to the charger of the eighth related embodiment, with respect to various carrying aspects, the charger is firmly held by a hand in at least two directions, and thus, convenience at the time of carrying can be improved.

According to the charger of the ninth related embodiment, the finger hook can be simply and inexpensively provided.

According to the charger of the tenth related embodiment, with respect to various carrying aspects, the charger is held by a hand in any direction, and the convenience at the time of carrying being able to be further improved.

According to the charger of the eleventh related embodiment, the internal capacity of the exterior case is expanded, and thus, it is possible to advantageously install the device body which is mounted in the inner portion of the exterior case.

Figure 13:
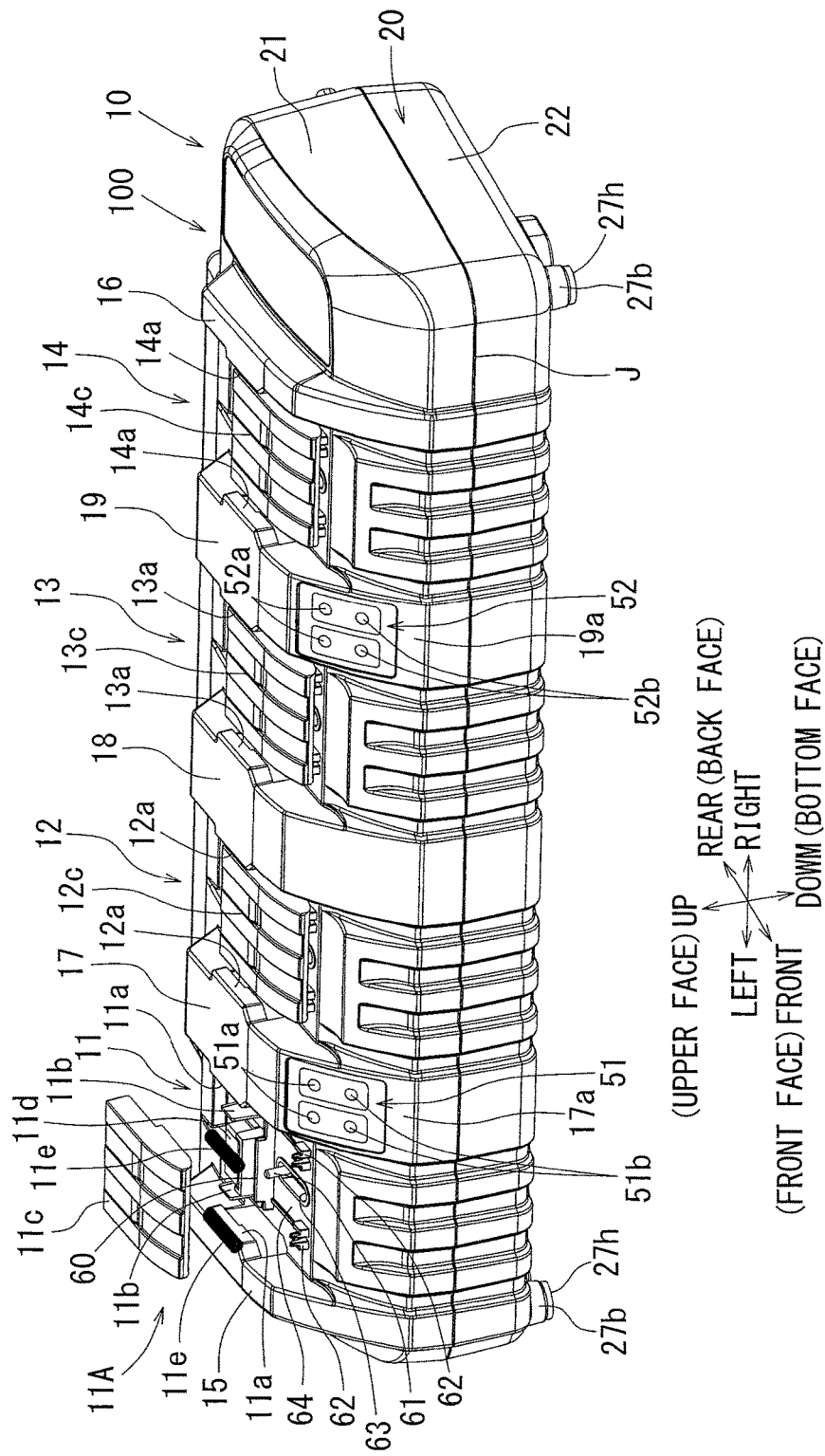
FIG. 13 is an overall perspective view when the charger according to an embodiment is viewed from an obliquely upper right side. This figure shows a state where a terminal cover in a first left-end battery attachment portion is disassembled.

Next, as shown in FIG. 13, four battery attachment portions 11 to 14 which are disposed to be able to be exposed to the outside are provided on a charger main body 100 configuring the charger 10. The charger main body 100 corresponds to a mounting device main body of the following twelfth to sixteenth related embodiments, and is configured to be able to charge the battery pack B. Moreover, the four battery attachment portions 11 to 14 correspond to a battery mounting structure of the following twelfth to sixteenth related embodiments. The four battery attachment portions 11 to 14 have the same configuration as one another with respect to mechanical and electrical attachment to the battery pack B. Hereinafter, as shown in a disassembled state in FIG. 13, the first left-end battery attachment portion 11 will be described. Positive and negative connection terminals 11b and 11b and a signal transmission and reception connector 11d are disposed between the receiving rail portions 11a and 11a provided on the right and the left of the first battery attachment portion 11. The positive and negative connection terminals 11b and 11b, and the signal transmission and reception connector 11d function as a charger terminal which is electrically connected so as to contribute to the charging of the battery pack B.

Figure 19:
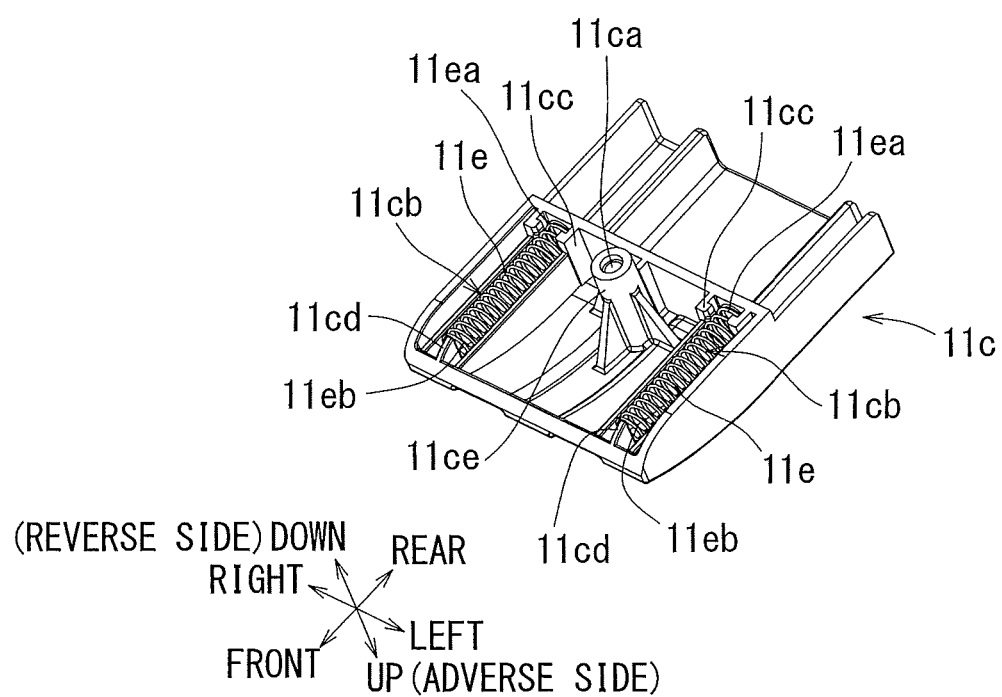
FIG. 19 is a perspective view when the terminal cover detached from the battery attachment portion is viewed from the lower surface side. This figure shows an assembled terminal cover in which a compression spring is temporarily fixed.

A terminal cover mechanism 11A is provided outside the positive and negative connection terminals 11b and 11b and the signal transmission and reception connector 11d. The terminal cover mechanism 11A substantially includes a terminal cover 11c which is a cover member and a compression spring 11e which is a biasing spring. The terminal cover 11c slides so that the position of the terminal cover is changed between both positions, that is, a covering position at which the positive and negative connection terminals 11b and 11b and the connector 11d are covered, and an exposure position at which the connection terminals 11b and 11b and the connector 11d are exposed to the outside to be connectable. The compression spring 11e biases the terminal cover 11c to slide the terminal cover in a direction of the covering position. Moreover, the covering position of the terminal cover 11c is set to the illustrated rear surface side, and the exposure position of the terminal cover 11c is set to the illustrated front surface side. That is, as shown in FIG. 19, a biasing-direction end 11ea of the compression spring 11e is set to the end of the compression spring 11e of the illustrated rear surface side. On the other hand, a support-base end 11eb of the compression spring 11e is an end opposite to the biasing-direction end 11ea, and is set to the end of the compression spring 11e of the illustrated front surface side.

The terminal cover mechanism 11A corresponds to a cover mechanism according to the following twelfth to sixteenth related embodiments. In this way, in the terminal cover mechanism 11A, the connection terminals 11b and 11b and the connector 11d are covered by the terminal cover 11c, and thus, the exposure of the connection terminals 11b and 11b and the connector 11d to the outside is prevented and the connection terminal and the connector can be protected from damage or the like. In this way, the terminal cover 11c can slide in the front-rear direction while being biased in the direction (closing direction) in which the cover slides to the rear surface side by the compression springs 11e and 11e. Methods are also performed on an assembly structure of the terminal cover 11c with respect to the first battery attachment portion 11.

That is, the biasing direction end 11ea of the compression spring 11e is permanently supported by a bias receiving portion 11cf provided on the terminal cover 11c. Moreover, the support base end 11eb of the compression spring 11e is temporarily supported by a temporarily fixed rib 11ed provided on the terminal cover 11c. In addition, the permanent support means a support in which the terminal cover 11c is supported even after the assembly. Moreover, the temporary support means a temporary support in which the terminal cover 11c is not supported after the assembly. The temporarily fixed rib 11cd corresponds to a temporarily receiving portion in the following twelfth to sixteenth related embodiments and is formed in one rib shape protruding toward the illustrated rear surface side. The temporarily fixed rib 11cd is formed to temporarily support the support base end 11eb of the compression spring 11e at the intermediate portion.

FIG. 19 shows the terminal cover 11c which is detached from the first battery attachment portion 11 or before the assembly is performed. One support boss portion 11ce is provided to protrude toward the lower side at the approximately center of the lower surface (rear surface) of the terminal cover 11c. A screw hole 11ea is provided at the center of the support boss portion 11ce. A pair of spring receiving portions 11cb and 11cb is provided on the right and left sides of the support boss portion 11ce on the lower surface of the terminal cover 11c.

The compression spring 11e is accommodated in each of both spring receiving portions 11cb and 11cb. The rear portion side of the compression spring 11e is interposed between holding portions 11cc provided on the rear portion of the spring receiving portion 11cb, and the rear portion side is in a state of being held so as not to be displaced in the extension and contraction directions (front-rear direction). The front portion side of the compression spring 11e is in a state of abutting the temporarily fixed rib 11cd provided on the front portion of the spring receiving portion 11cb. Accordingly, the front portion side of each of both compression springs 11e and 11e abuts each temporarily fixed rib 11cd in the state where the front portion side can be displaced in the extension and contraction directions. In this way, in the assembly state where two compression springs 11e and 11e are held (temporarily fixed) to the spring receiving portions 11eb and 11cb, the terminal cover 11c is assembled on the first battery attachment portion 11.

Figure 18:
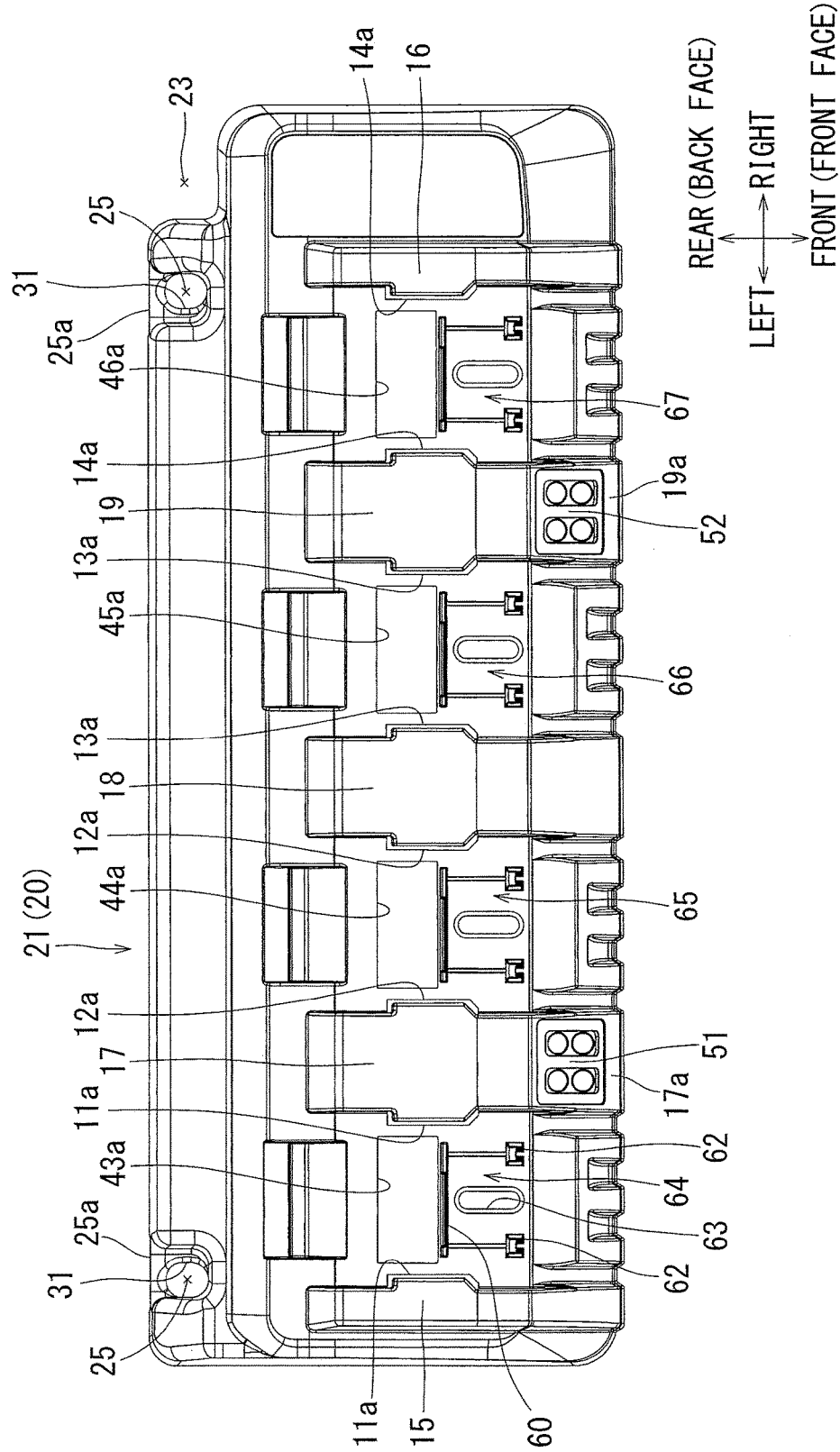
FIG. 18 is a plan view of the upper divided housing. This figure shows the upper divided housing of a single unit state in a disassembled state where terminal covers of first to fourth battery attachment portions are detached.

FIG. 18 shows the state of the upper divided housing 21 before the assembly in which all the first to fourth battery attachment portions 11 to 14 are detached. First to fourth pedestal portions 64 to 67 corresponding to the first to fourth battery attachment portions 11 to 14 are provided on the upper surface of the upper divided housing 21. As shown in the drawings, since the first to fourth pedestal portions 64 to 67 have the same configuration as one another, hereinafter, the first pedestal portion 64 of the left end will be described.

A rectangular window portion 43a is provided at the center of the first pedestal portion 64 corresponding to the first battery attachment portion 11. As shown in other drawings, the connection terminals 11b and 11b and the connector 11d of a first terminal plate 43 protrude to the upper side via the window portion 43a. The support structures of the first to fourth terminal plates 43 to 46 will be described below. A closing stopper wall portion 60 is provided to protrude to the upper portion at the front side (the lower side in FIG. 18) of the window portion 43a. A pair of right and left spring receiving ribs 62 and 62 is provided to protrude to the upper portion at the front side of the closing stopper wall portion 60. The spring receiving rib 62 corresponds to a permanently receiving portion in the twelfth to sixteenth related embodiments, and permanently supports the support base end 11eb of the compression spring 11e. Two spring receiving ribs 62 are set to be disposed at both sides of one temporarily fixed rib 11cd after the terminal cover 11c is assembled. That is, as also shown in FIG. 13, each of both spring receiving ribs 62 and 62 is formed in a fork shape which has a slit at the center in the right-left direction. A relationship between the spring receiving rib 62 and the temporarily fixed rib 11cd is set so that when the terminal cover mechanism 11A is assembled on the charger main body 100, the support base end of the compression spring 11e temporarily supported by the temporarily fixed rib 11cd of the terminal cover 11c is transferred from the abutment state of the temporarily fixed rib 11cd to the abutment state of the spring receiving rib 62 according to the assembly movement of the terminal cover 11c, and after the terminal cover 11c is assembled, the support base end is permanently supported by the spring receiving rib 62. Specifically, after the terminal cover 11c is assembled, the position of the support base end 11eb permanently supported by the spring receiving rib 62 is positioned as illustrated further toward the rear surface side compressing the compression spring 11e compared to the position of the support base end 11eb temporarily supported by the temporarily fixed rib 11cd.

Figure 20:
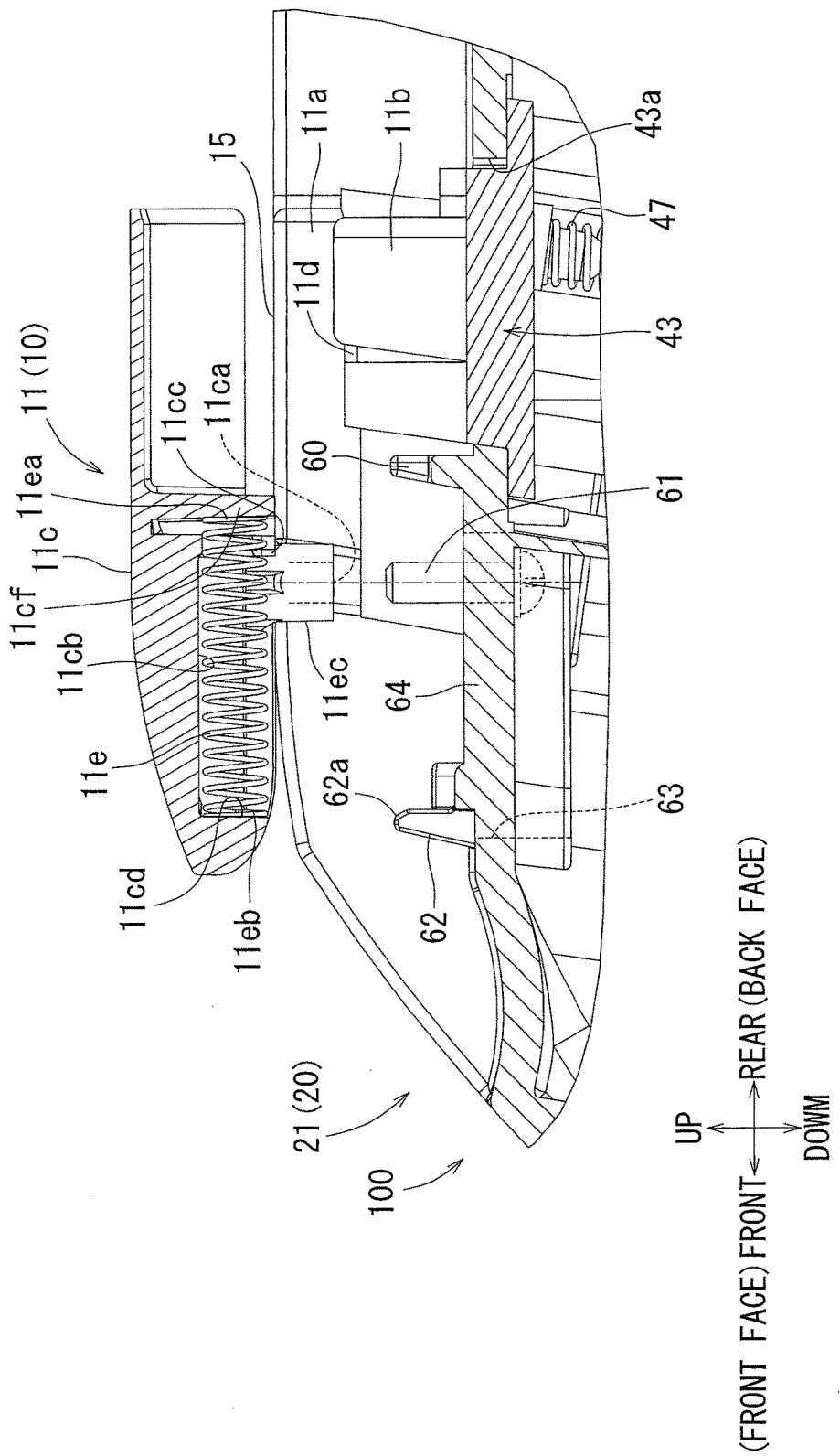
FIG. 20 is a view showing an assembly procedure of the terminal cover, and a longitudinal cross-sectional view of the first battery attachment portion. This figure shows a state just before the terminal cover is assembled on a cover support seat portion of the first battery attachment portion.

Moreover, as shown in the figures after FIG. 20, guide inclination surfaces 62a and 62a which descend to the rear side are provided on the upper rear surfaces of both spring receiving ribs 62 and 62. The guide inclination surfaces 62a and 62a are portions which are set to transfer starting portions of the spring receiving rib 62 when the support base end 11eb of the compression spring 11e is transferred from the abutment position of the temporarily fixed rib 11cd to the abutment position of the spring receiving rib 62. That is, the guide inclination surfaces 62a and 62a have a function of guiding the support base end 11eb of the compression spring 11e toward the compressed rear surface side according to the transfer of the support base end 11eb of the compression spring 11e. Specifically, the guide inclination surfaces 62a and 62a have shapes which are inclined to support the support base end 11eb of the compression spring 11e in the compressed direction of the compression spring 11e. Moreover, after the terminal cover 11c is assembled, the spring receiving ribs 62 and 62 support the support base end 11eb of the compression spring 11e at the position deviated from the temporarily fixed rib 11cd to the rear surface side.

In addition, apexes 62b and 62b of the guide inclination surfaces 62a and 62a are positioned to be slightly deviated from the position of the temporarily fixed rib 11cd after the terminal cover 11c is connected to the front surface side. Accordingly, when the abutment position of the support base end 11eb is transferred from the temporarily fixed rib 11cd to the spring receiving rib 62, the transfer starts smoothly. That is, according to the disposition positions of the apexes 62b and 62b and the inclination structures of the guide inclination surfaces 62a and 62a, even when the assembly movement of the terminal cover 11c is performed from just above to just below the cover, the abutment position of the support base end 11eb of the compression spring 11e can be transferred from the temporarily fixed rib 11cd to the spring receiving rib 62.

Figure 23:
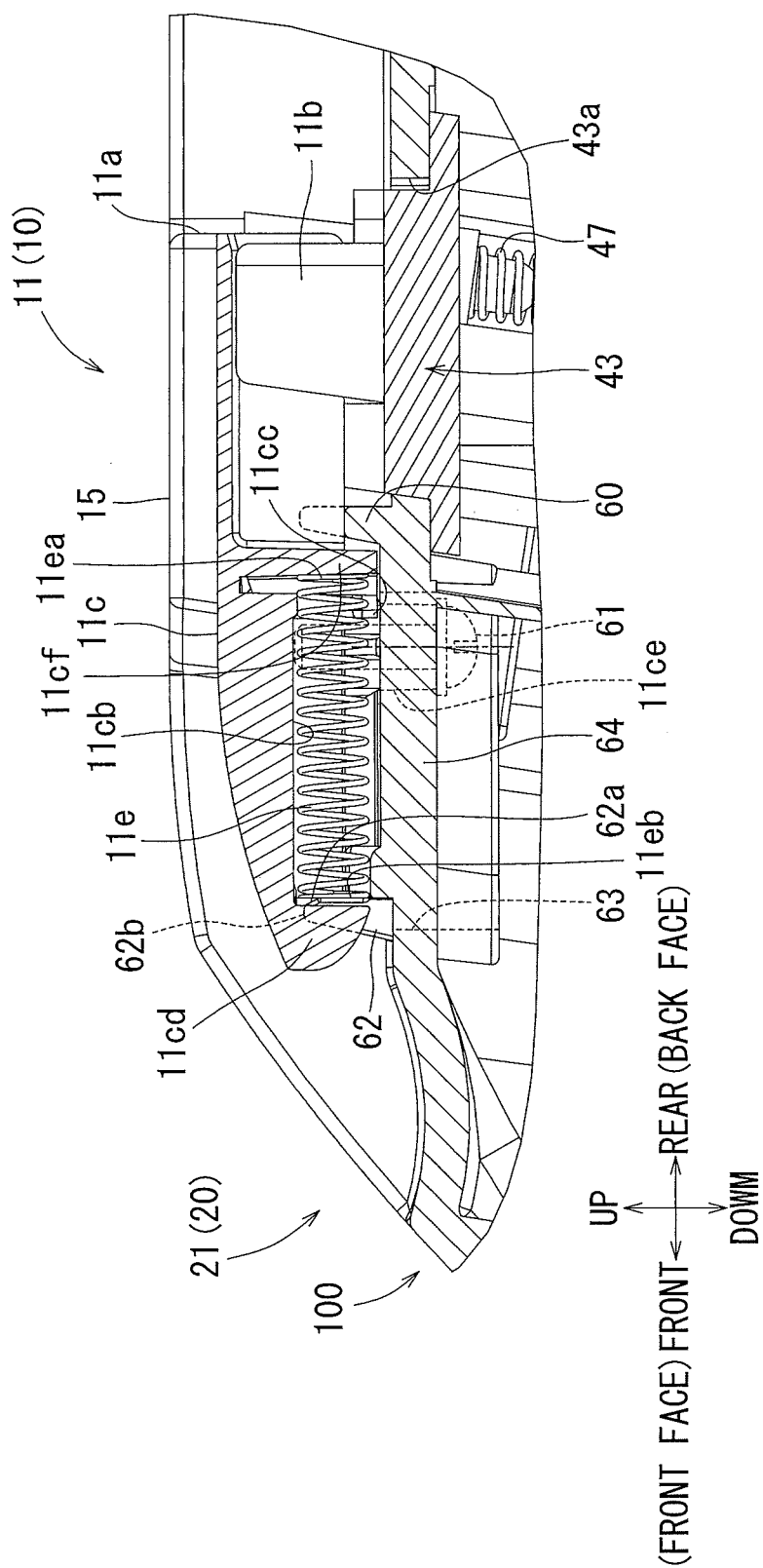
FIG. 23 is a view showing the assembly procedure of the terminal cover, and a longitudinal cross-sectional view of the first battery attachment portion. The figure shows an assembly completion state in which the front portion of the compression spring is completely received and delivered to the spring receiving rib of the upper divided housing and in which fixing screws are completely fastened.

As shown in FIGS. 13 and 18, one groove hole 63 is provided between the right and left spring receiving ribs 62 and 62. The groove hole 63 extends from the portion between both spring receiving ribs 62 and 62 to the rear side, and reaches an area in front of the closing stopper wall portion 60. The groove hole 63 has a width dimension through which the support boss portion 11ce of the terminal cover 11c can be inserted, and is provided to penetrate in the thickness direction of the first pedestal portion 64. As shown in FIG. 23, a fixing screw 61 is fastened to the screw hole 11ea of the support boss portion 11ce, which is inserted from above into the groove hole 63, from the lower portion, and thus, the terminal cover 11c is in an assembled state so as to be slidably supported with a constant stroke in the front-rear direction on the first pedestal portion 64.

FIGS. 20 to 23 show the assembly procedure of the terminal cover 11c with respect to the first battery attachment portion 11. As shown in FIG. 20, before the terminal cover 11c is assembled, the terminal cover 11c is in an assembled state in which two compression springs 11e and 11e are temporarily fixed to the lower surface of the terminal cover. After the terminal cover 11c is set to the first pedestal portion 64, one fixing screw 61 is inserted from the lower portion of the groove hole 63 and is fastened to the screw hole 11ea, and the assembly of the terminal cover 11c is completed.

Figure 21:
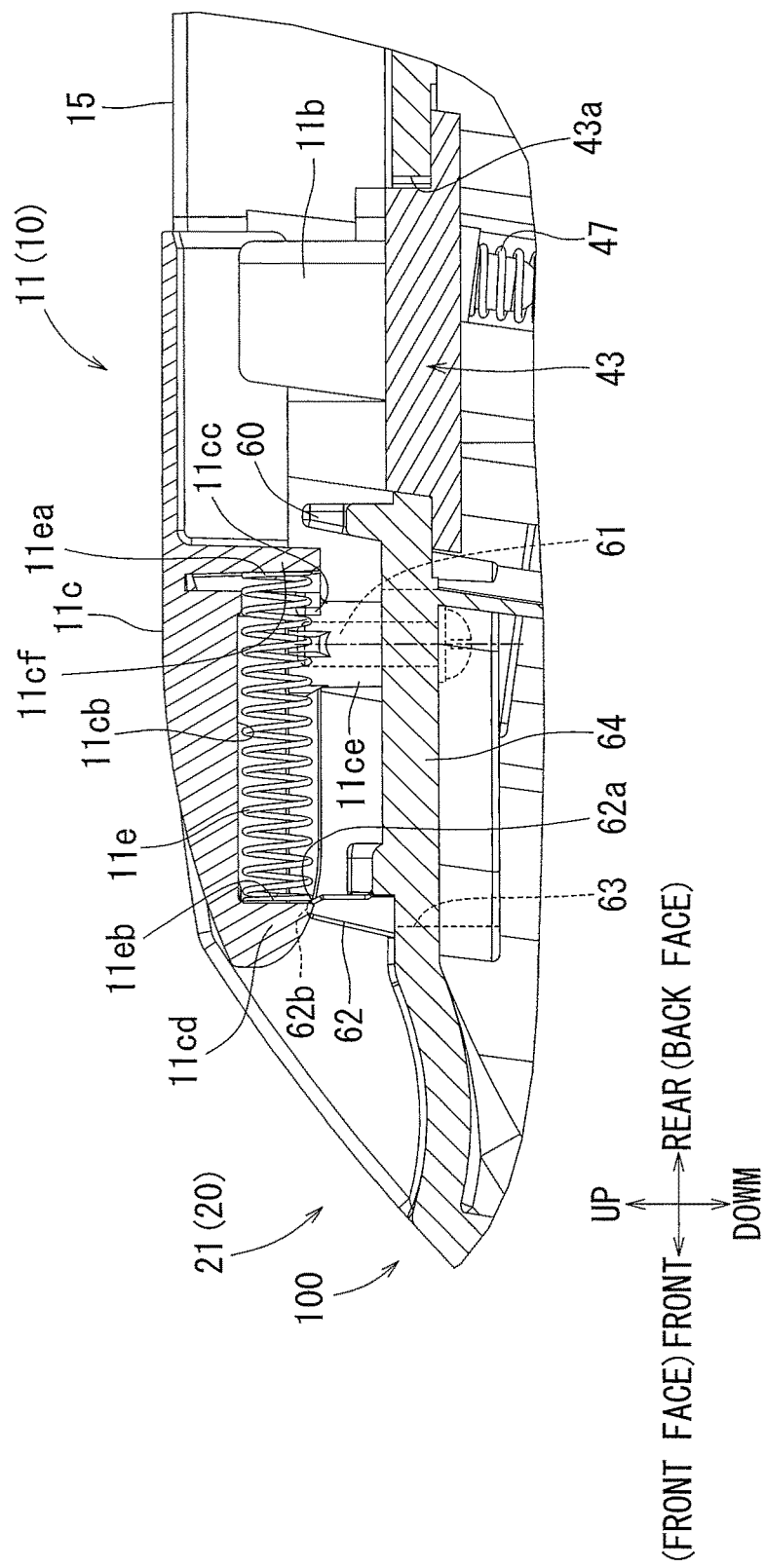
FIG. 21 is a view showing the assembly procedure of the terminal cover, and a longitudinal cross-sectional view of the first battery attachment portion. This figure shows a state where insertion of a support boss portion of the terminal cover into a groove hole starts.

First, as shown in FIG. 21, the terminal cover 11c is moved to cover the first pedestal portion 64 while the support boss portion 11ce is inserted into the groove hole 63 from the upper side. At this time, preferably, as shown in the drawings, each of the right and left temporarily fixed ribs 11cd and 11cd is moved from the rear side position which substantially is the closed position of the terminal cover with respect to the position of the terminal cover 11c in the front-near direction so that each temporarily fixed rib is inserted into the slit of the spring receiving rib 62.

When the terminal cover 11c is moved to the first pedestal portion 64, the support boss portion 11ce is inserted into the groove hole 63, and as shown in FIG. 21, each of the front ends of the right and left compression springs 11e and 11e is pressed to the guide inclination surface 62a of the spring receiving rib 62.

Figure 22:
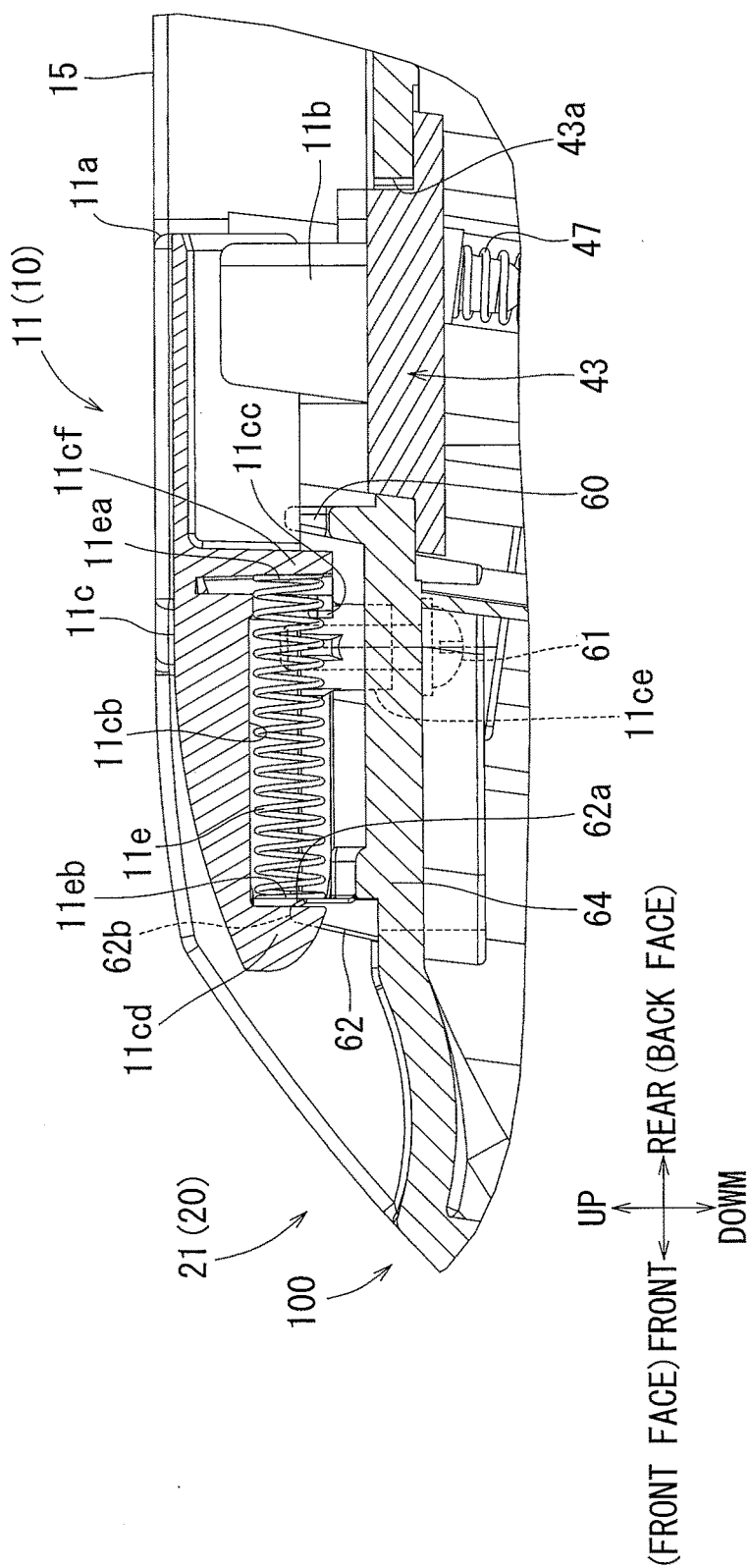
FIG. 22 is a view showing the assembly procedure of the terminal cover, and a longitudinal cross-sectional view of the first battery attachment portion. The figure shows when a front portion of the compression spring is received and delivered from a temporarily fixed rib of the terminal cover to a spring receiving rib of the upper divided housing.

When the terminal cover 11c further moves to the first pedestal portion 64 to be parallel with the lower portion in the state where each of the front ends of the right and left compression springs 11e and 11e is pressed to the guide inclination surface 62a of the spring receiving rib 62, as shown in FIG. 22, the front ends of both compression springs 11e and 11e are slightly pressed in the contraction directions and separated from the temporarily fixed ribs 11cd and 11cd, and transferred to abut the rear surfaces of the spring receiving ribs 62 and 62.

In this way, in the state where each of the front ends of both compression springs 11e and 11e is transferred from the temporarily fixed rib 11cd to the spring receiving rib 62, as shown in FIG. 23, the terminal cover 11c is in a set state in which the terminal cover 11c further moves to a position where approximately abuts the first pedestal portion 64. In this state, when the fixing screw 61 is fastened to the screw hole 11ca of the support boss portion 11ce, the assembly work of the terminal cover 11c with respect to the first pedestal portion 64 is completed. In this step, the front end sides of the right and left compression springs 11e and 11e abut the spring receiving rib 62 (first pedestal portion 64 side), and thus, biasing forces of the compression springs 11e and 11e operate in a direction where the terminal cover 11c slides to the closed side (rear side).

In this way, when the terminal cover 11c, which is in the assembled state in which each of two compression springs 11e and 11e is temporarily fixed with respect to the spring receiving portion 11cb, is connected to the first pedestal portion 64, the front end sides of both temporarily fixed compression springs 11e and 11e are automatically transferred to the spring receiving rib 62 side, and the biasing forces operate toward the side in which the terminal cover 11c is closed. Accordingly, without performing troublesome work such as the movement of the front ends of the compression springs 11e and 11e during the assembly work using a specialized tool or the like and without guiding the compression springs 11e and 11e by a jig or the like, an operator can rapidly and securely complete the assembly work by only moving the terminal cover 11c. According to the assembly work, each of the terminal covers 12c, 13c, and 14c can be rapidly and securely assembled to each of the second to fourth pedestal portions 65 to 67.

The battery pack B slides from the rear surface side toward the front surface side in a slightly descending direction while the terminal cover 11c assembled as described above is pressed to be opened to the front surface side against the compression springs 11e and 11e, and the battery pack B can be attached to the first battery attachment portion 11. When the battery pack B is attached to the first battery attachment portion 11, the battery pack B is mechanically fixed to the charger 10 and electrically connected to the charger, and the battery pack can be charged. Moreover, a total of four battery packs B to B are attached to the second battery attachment portion 12, the third battery attachment portion 13, and the fourth battery attachment portion 14 positioned at the right side of the first battery attachment portion 11, in addition to the first left-end battery attachment portion 11, and thus, four battery packs can be simultaneously charged.

According to the first battery attachment portion 11 configured as described above, when the terminal cover mechanism 11A is assembled on the charger main body 100, the support base end 11eb of the compression spring 11e temporarily supported by the temporarily fixed rib 11cd of the terminal cover 11c is transferred from the abutment position of the temporarily fixed rib 11cd to the abutment position of the spring receiving rib 62 according to the assembly movement of the terminal cover 11c, and the support base end can be permanently supported by the spring receiving rib 62 after the terminal cover 11c is assembled. Accordingly, the terminal cover mechanism 11A can be assembled on the charger main body 100 without using a jig or the like. Moreover, according to the above-described first battery attachment portion 11, compared to the position of the support base end 11eb temporarily supported by the temporarily fixed rib 11cd, the position of the support base end 11eb permanently supported by the spring receiving rib 62 is further displaced to the rear surface side to which the compression spring 11e is compressed, and thus, the permanent support of the support base end 11eb by the spring receiving rib 62 after the terminal cover 11c is assembled can be more securely performed. In addition, according to the above-described first battery attachment portion 11, the guide inclination surfaces 62a and 62a guide the support base end 11eb of the compression spring 11e toward the rear surface side, to which the compression spring is compressed, according to the transfer of the support base end 11eb of the compression spring 11e, and thus, the transfer according to the assembly movement of the terminal cover 11c can be more smoothly performed. Moreover, according to the above-described first battery attachment portion 11, since one temporarily fixed rib 11c temporarily supports the support base end 11eb at the intermediate portion, and the support base end is permanently supported by two spring receiving ribs 62 disposed at both sides of the one temporarily fixed rib 11cd after the assembly, the support range of the permanent support is expanded and a stable support can be realized while the structures of the temporarily fixed rib 11cd and the spring receiving rib 62 can be combined with each other to be smaller.

In addition, various modifications can be applied to the exemplified embodiment. For example, in the above-described embodiment, the charger 10 including the structure, in which the battery pack B slides to be attached, is exemplified. However, the mounting device main body according to the following twelfth to sixteenth related embodiments is not limited to this, and can be widely applied to a structural body including a structure in which the chargeable type battery slides to be attached.

Moreover, the configurations of the temporarily receiving portion and the permanently receiving portion according to the following twelfth to sixteenth related embodiments are not limited to the example which combines the temporarily fixed rib 11cd and the spring receiving rib 62 of the above-described embodiment, and combinations of appropriate aspects can be selected. Moreover, appropriate methods may be applied to the assembly movement of the terminal cover 11c, and any movements may be adopted as long as at least the abutment position of the support base end 11eb of the compression spring 11e can be transferred from the temporarily fixed rib 11cd to the spring receiving rib 62.

The above-described configuration can be understood by the following twelfth to sixteenth related embodiments.

According to the twelfth related embodiment, there is provided a battery mounting structure which is disposed to be capable of being exposed outside a mounting device main body in which a mounting side terminal electrically connectable to a battery terminal of a chargeable type battery mounted in a sliding manner is configured to be electrically connectable, in which a cover mechanism preventing exposure of the mounting side terminal to the outside when the chargeable type battery is not mounted is provided on the mounting device main body, the cover mechanism includes: a cover member in which the cover member slides between both positions of a covering position covering the mounting side terminal and an exposure position exposing the mounting side terminal to the outside to be connectable and the position of the cover member is changed; and a biasing spring which slide-biases the cover member in the direction which will bring about the covering position so that the cover member is positioned at the covering position, a biasing direction end of the biasing spring which becomes a biasing direction end of the cover member is permanently supported by the bias receiving portion provided on the cover member, a support base end of the biasing spring which becomes an end opposite the biasing direction end is temporarily supported by a temporarily receiving portion provided on the cover member, a permanently receiving portion permanently supporting the support base end of the biasing spring is provided on the mounting device main body, a relationship between the permanently receiving portion and the temporarily receiving portion is set so that the support base end of the biasing spring temporarily supported by the temporarily receiving portion of the cover member is transferred from abutment of the temporarily receiving portion to abutment of the permanently receiving portion according to an assembly movement of the cover member when the cover mechanism is assembled on the mounting device main body, and the support base end is permanently supported by the permanently receiving portion after the cover mechanism is assembled. In addition, here, the "permanent support" means a support in which the cover mechanism is supported even after the assembly, and the "temporary support" means a temporary support in which the cover mechanism is not supported after the assembly.

According to the twelfth related embodiment, when the cover mechanism is assembled on the mounting device main body, the support base end of the biasing spring temporarily supported by the temporarily receiving portion of the cover member is transferred from the abutment position of the temporarily receiving portion to the abutment position of the permanently receiving portion according to the assembly movement of the cover member, and the support base end can be permanently supported by the permanently receiving portion after the cover member is assembled. Accordingly, the cover mechanism can be assembled on the mounting device main body without using a jig or the like.

According to the battery mounting structure of the thirteenth related embodiment, in the battery mounting structure according to the twelfth related embodiment, the relationship between the permanently receiving portion and the temporarily receiving portion is configured such that the position of the support base end permanently supported by the permanently receiving portion after the cover member is assembled is positioned to further approach in a direction in which the biasing spring is compressed compared to the position of the support base end temporarily supported by the temporarily receiving portion. According to the battery mounting structure of the thirteenth related embodiment, since the position of the support base end permanently supported by the permanently receiving portion is positioned to further approach in a direction in which the biasing spring is compressed compared to the position of the support base end temporarily supported by the temporarily receiving portion, the permanent support of the support base end by the permanently receiving portion after the cover member is assembled can be more securely performed.

According to the battery mounting structure of the fourteenth related embodiment, in the battery mounting structure according to the thirteenth related embodiment, a shape is provided on a transfer starting portion of the permanently receiving portion when the support base end of the biasing spring is transferred from the abutment position of the temporarily receiving portion to the abutment position of the permanently receiving portion, and the shape is inclined to support the support base end of the biasing spring in the direction in which the biasing spring is compressed according to the transfer from the abutment position of the temporarily receiving portion to the abutment position of the permanently receiving portion. According to the battery mounting structure of the fourteenth related embodiment, since the shape, which is inclined to support the support base end of the biasing spring in the direction in which the biasing spring is compressed according to the transfer from the abutment position of the temporarily receiving portion to the abutment position of the permanently receiving portion, is provided on the transfer starting portion, the transfer according to the assembly movement of the cover member can be more smoothly performed.

According to the battery mounting structure of the fifteenth related embodiment, in the battery mounting structure according to the thirteenth or fourteenth related embodiment, the temporarily receiving portion temporarily supports the support base end of the biasing spring at the intermediate portion, and the permanently receiving portion permanently supports the cover member at both sides of the temporarily receiving portion after the cover member is assembled. According to the battery mounting structure of the fifteenth related embodiment, since the temporarily receiving portion temporarily supports the cover member at the intermediate portion and the permanently receiving portion permanently supports the cover member at both sides of the temporarily receiving portion after the cover member is assembled, the support range of the permanent support is expanded and a stable support can be realized while the structures of the temporarily receiving portion and the permanently receiving portion can be combined with each other to be smaller.

According to the sixteenth related embodiment, there is provided a charger including the battery mounting structure of any one of the twelfth to fifteenth related embodiments, the mounting device main body is a charger main body which is configured to charge the chargeable type battery, the mounting side terminal is a charger terminal which contributes to the charging of the chargeable type battery, and the cover mechanism is a terminal cover mechanism which is disposed outside the charger terminal. According to the charger of the sixteenth related embodiment, the charger may have the function as the terminal cover mechanism disposed outside the charger terminal of the charger, and can provide effects of the twelfth to fifteenth related embodiments in the terminal cover mechanism.

According to the battery mounting structure of the twelfth related embodiment, the cover mechanism can be assembled on the mounting device main body without using a jig or the like.

According to the battery mounting structure of the thirteenth related embodiment, the permanent support of the support base end by the permanently receiving portion after the cover member is assembled can be more securely performed.

According to the battery mounting structure of the fourteenth related embodiment, the transfer according to the assembly movement of the cover member can be more smoothly performed.

According to the battery mounting structure of the fifteenth related embodiment, the support range of the permanent support is expanded and a stable support can be realized while the structures of the temporarily receiving portion and the permanently receiving portion can be combined with each other to be small.

According to the charger of the sixteenth related embodiment, the charger can provide effects of the twelfth to fifteenth related embodiments in the terminal cover mechanism while having the function as the terminal cover mechanism disposed outside the charger terminal of the charger.

Figure 14:
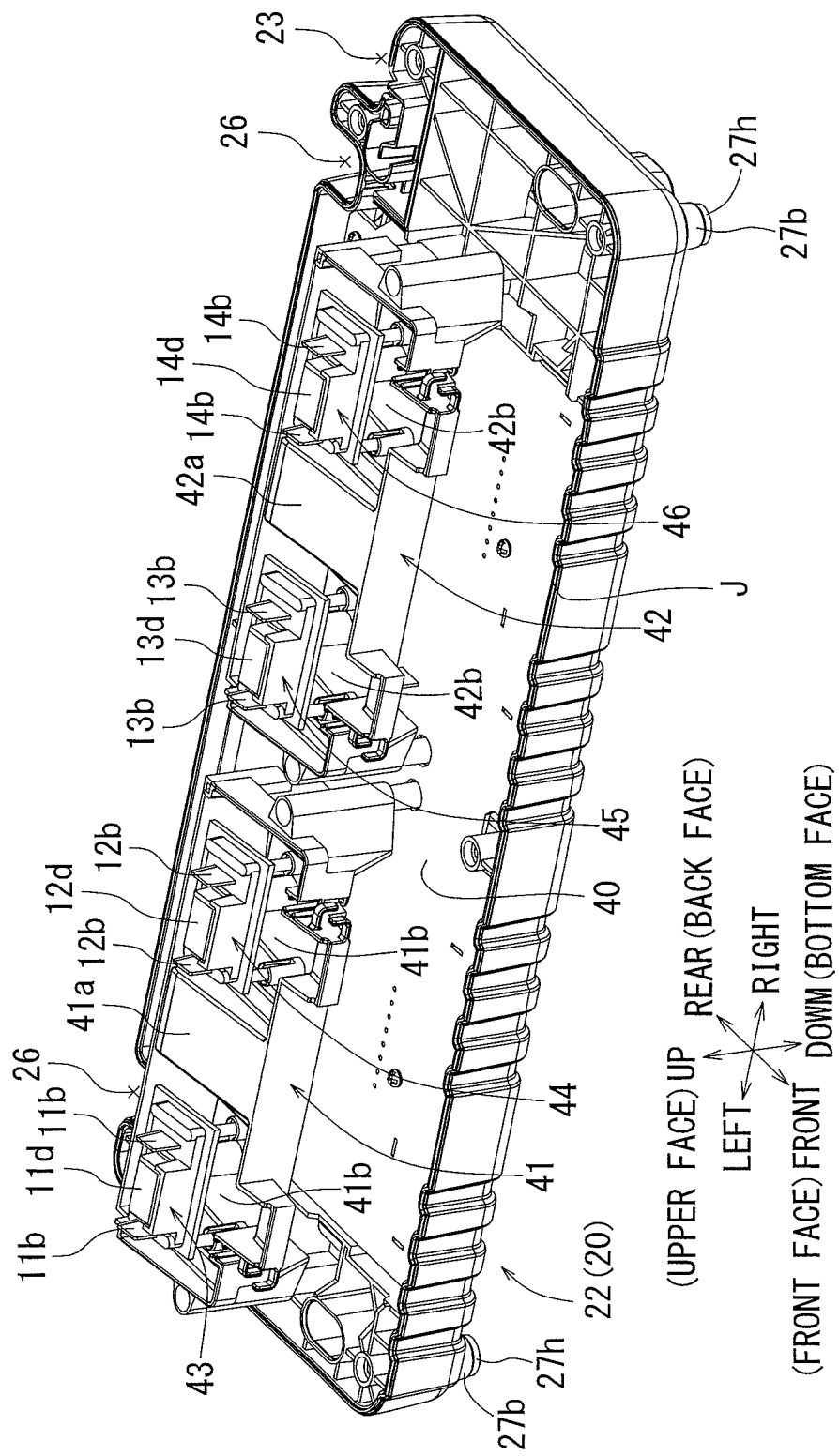
FIG. 14 is a perspective view when a lower divided housing is viewed from an obliquely upper right side in a state where an upper divided housing of the charger according to the present embodiment is detached.
Figure 15:
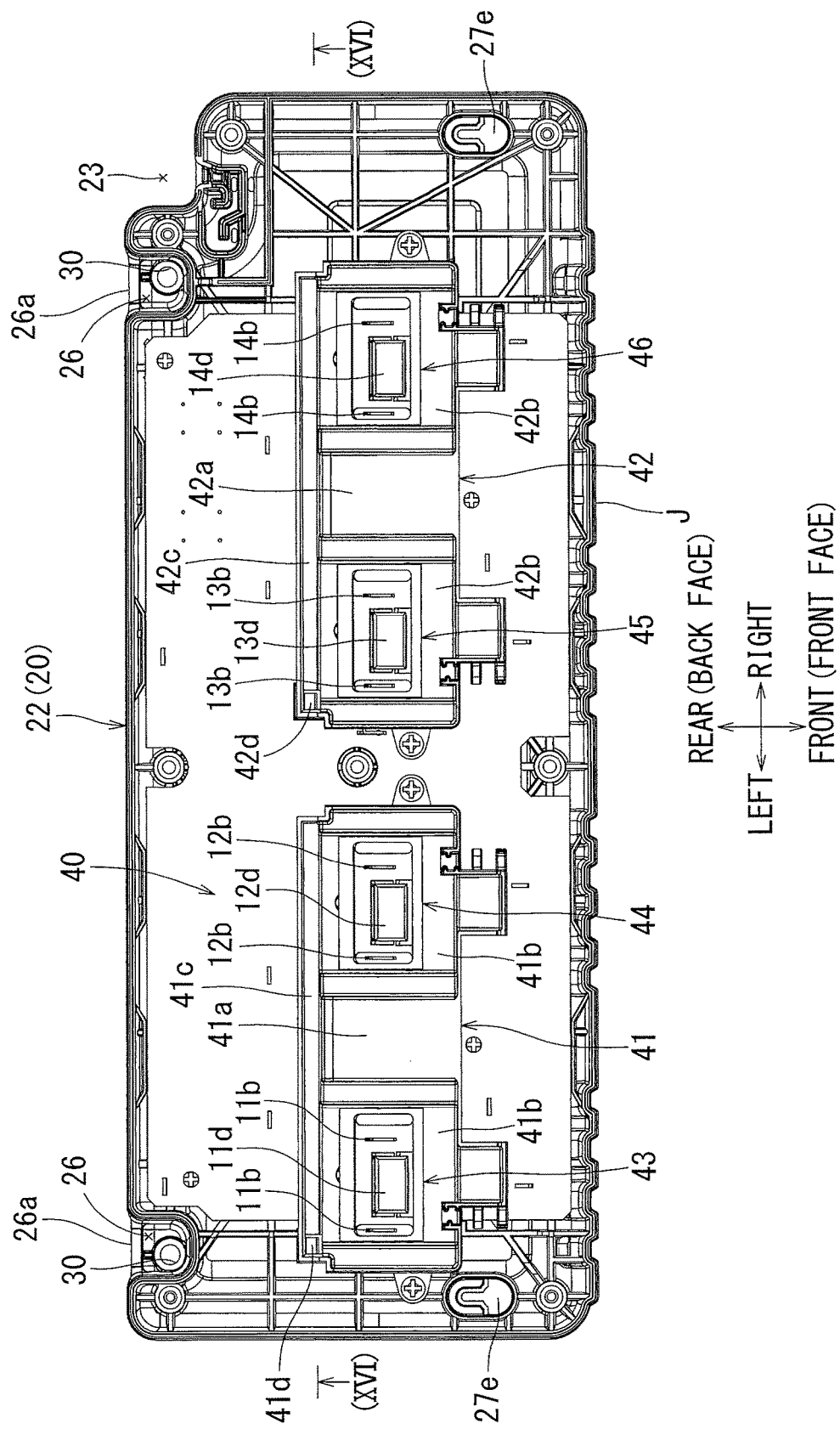
FIG. 15 is a plan view of the lower divided housing in a state where the upper divided housing of the charger according to an embodiment is detached.
Figure 16:
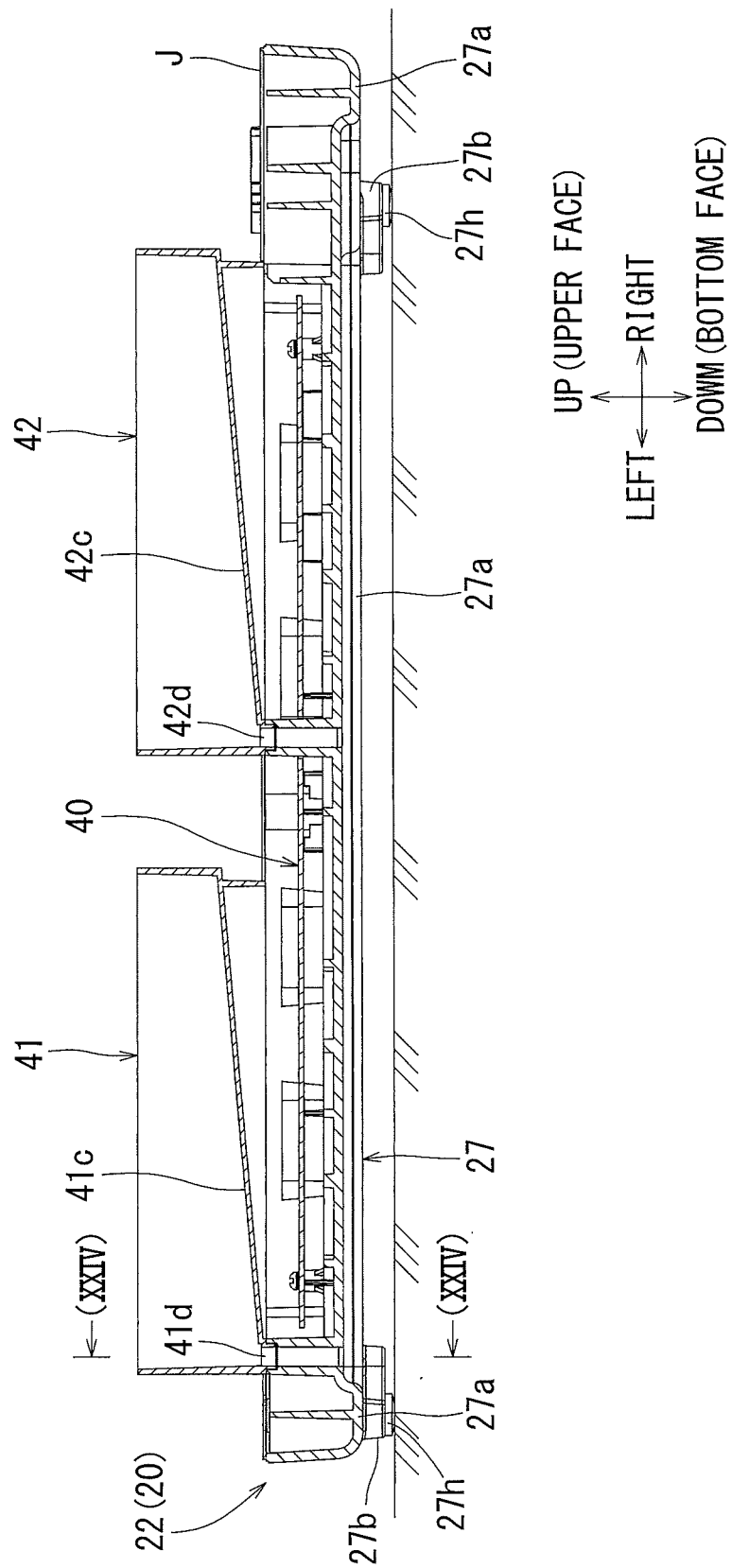
FIG. 16 is a cross-sectional view taken along line (XVI)-(XVI) of FIG. 15 and is a longitudinal cross-sectional view in a longitudinal direction of the lower divided housing.
Figure 17:
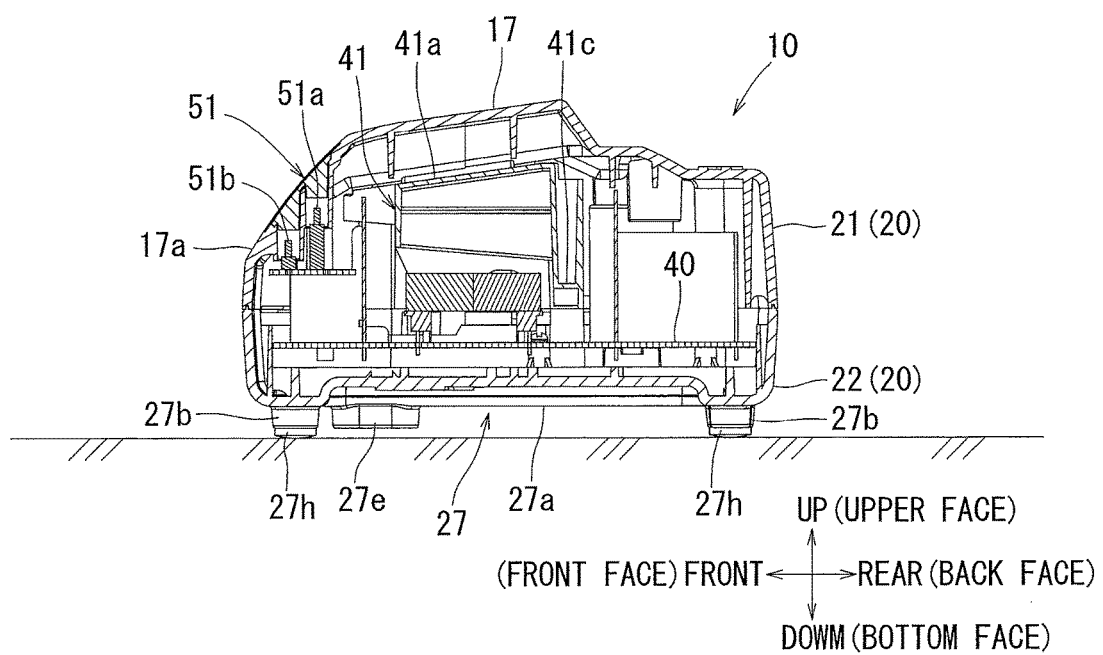
FIG. 17 is a cross-sectional view taken along line (XVII-XVII) of FIG. 5. This figure is a longitudinal cross-sectional view of the charger, and is a longitudinal cross-sectional view of a first operation display portion.

As described above, the first to fourth battery attachment portions 11 to 14 individually include the configuration for charging the battery packs B independently from one another. However, methods for charging the battery attachment portions together have been performed. FIGS. 14 to 16 show the lower divided housing 22 and the internal structure in the charger 10 in the state where the upper divided housing 21 is detached. In the drawings, the same reference numerals are assigned to the above-described members or configurations such as the recessed portion 23 for drawing out the power source cord.

The control substrate 40 having a flat plate shape is attached with a predetermined gap along the bottom portion 27 in the lower divided housing 22.

Two terminal receiving boards 41 and 42 are provided in parallel in the right-left direction on the upper portion of the control substrate 40. The first terminal plate 43 and the second terminal plate 44 are mounted on the first left terminal receiving board 41. The third terminal plate 45 and the fourth terminal plate 46 are mounted on the second right terminal receiving board 42.

The positive and negative connection terminals 11b and 11b and the signal transmission and reception connector 11d for the first battery attachment portion 11 are mounted on the first terminal plate 43. The positive and negative connection terminals 12b and 12b and the signal transmission and reception connector 12d for the second battery attachment portion 12 are mounted on the second terminal plate 44. The positive and negative connection terminals 13b and 13b and the signal transmission and reception connector 13d for the third battery attachment portion 13 are mounted on the third terminal plate 45. The positive and negative connection terminals 14b and 14b and the signal transmission and reception connector 14d for the fourth battery attachment portion 14 are mounted on the fourth terminal plate 46. As shown in FIG. 20, a spring 47 is attached to the lower portion of each of the terminal plates 43 to 46, and the terminal plate 43 and the upper divided housing 21 are configured to come into close contact with each other through the biasing force of the spring 47 when the upper divided housing 21 is attached.

When the upper divided housing 21 is connected to the lower divided housing 22, as described above, the first to fourth terminal plates 43 to 46 protrude from the first to fourth pedestal portions 64 to 67 of the upper divided housing 21 to the upper surface sides via the rectangular window portions 43a to 46a provided on the first to fourth pedestal portions 64 to 67 of the upper divided housing 21, and thus, the connection terminals 11b to 14b and the connectors 11d to 14d in the battery attachment portions 11 to 14 protrude to be connectable to the battery pack B.

Top plate portions 41a and 42a, which are bent in a rectangular shape toward the upper portion between the first terminal plate 43 and the second terminal plate 44 and between the third terminal plate 45 and the fourth terminal plate 46, are formed on the bottom portions of both terminal receiving boards 41 and 42. Accordingly, the space in the height direction between both top plate portions 41a and 42a and the control substrate 40 is significantly larger than the space in the height direction between the bottom portions 41b and 42b supporting the first to fourth terminal plates 43 to 46 and the control substrate 40. Therefore, a large electronic member having a large height dimension such as a capacitor or a transformer can be mounted on the control substrate 40 on the lower portions of both top plate portions 41a and 42a.

As shown in FIG. 16, each of both drain channels 41c and 42c is provided on the rear surface side of each of both terminal receiving boards 41 and 42. Both drain channels 41c and 42c are respectively provided over the entire width in the right and left width directions from the right ends to the left ends of both terminal receiving boards 41 and 42. As shown in the drawings, each of both drain channels 41c and 42c is inclined in a direction descending to the left side. Drain outlets (drain holes) 41d and 42d are respectively provided on the lowest portions which are the left ends of both terminal receiving boards 41 and 42.

Figure 24:
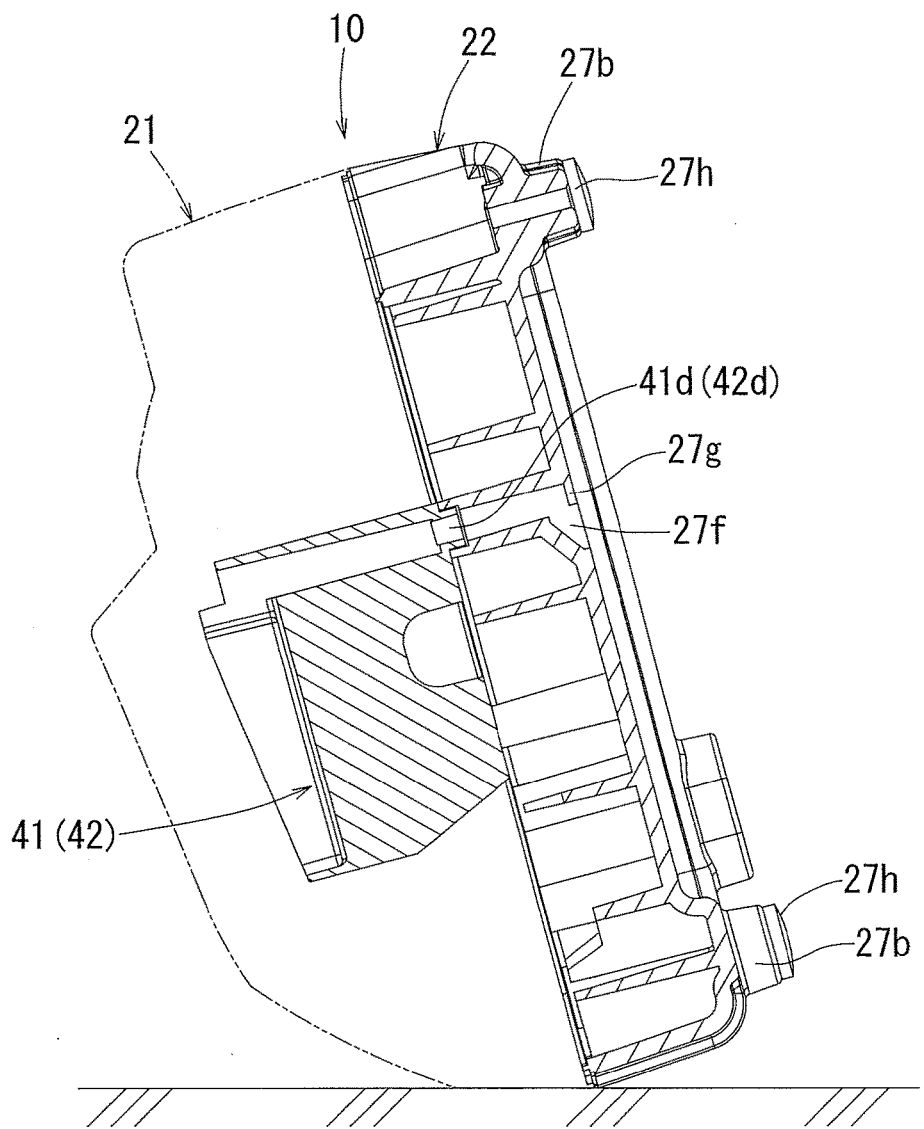
FIG. 24 is a cross-sectional view taken along line (XXIV)-(XXIV) of FIG. 16, and a longitudinal cross-sectional view when the front side of the charger is positioned downward.

As shown in FIG. 24, each of both drain outlets 41d and 42d communicates with a drain outlet 27f, which is open to the bottom surface 27, via the side of the control substrate 40. As shown in the drawings, the drain outlet 27f is inclined towards the front surface side, and an eaves portion 27g is provided to protrude to the front surface side along the bottom surface at the rear portion (the upper portion in FIG. 24) of the drain outlet. According to the eaves portion 27g, as shown in the drawings, when the charger 10 is mounted in the rising state in which the front surface side is grounded, a backflow of rainwater or the like falling from the upper portion toward the drain outlets 41d and 42d sides and the terminal plates 43 to 46 sides is prevented. In addition, also in the case in which the charger 10 is carried in the state where the strap ST is hung on a shoulder while the front surface side of the charger is directed downward, according to the eaves portion 27g, 27g, a backflow of rainwater or the like toward the drain outlets 41d and 42d sides and eventually the terminal plates 43 to 46 sides is prevented.

In this way, according to the drain channels 41c and 42c and the drain outlets 41d and 42d provided on both terminal receiving boards 41 and 42, rainwater or the like pouring on the charger 10 is not accumulated on the terminal receiving boards 41 and 42 and drains to the outside of the main body housing 20, and thus, submersion of the control substrate 40 is prevented, and water-proofing property (durability) of the charger 10 can be increased.

Moreover, compared to four separate terminal receiving boards being respectively set to the terminal plates 43, 44, 45, and 46, in a total of four battery attachment portions 11 to 14, the first terminal plate 43 of the first battery attachment portion 11 and the second terminal plate 44 of the second battery attachment portion 12 are mounted on the first common terminal receiving board 41, the third terminal plate 45 of the third battery attachment portion 13 and the fourth terminal plate 46 of the fourth battery attachment portion 14 are mounted on the second common terminal receiving board 42, four terminal plates 43 to 46 are supported by two terminal receiving boards 41 and 42, and thus, the number of parts (common use of parts) can be reduced.

Moreover, the common drain channel 41c (42c) and drain outlet 41d (42d) are provided with respect to one terminal receiving board 41 (42) supporting two terminal plates 43 and 44 (45 and 46), and in this regard, the common parts or configurations with respect to the plurality of battery attachment portions can be used.

In addition, compared to a case when the terminal receiving boards 41 and 42, the drain channels 41c and 42c, and the drain outlets 41d and 42d are set separately, when common use of the parts of the terminal receiving boards 41 and 42 is achieved and the drain channels 41c and 42c and the drain outlets 41d and 42d are used together with respect to the plurality of battery attachment portions 11 to 14, the space in the main body housing 20 is effectively used, and thus, for example, a large electronic part or a plurality of electronic parts can be mounted on the control substrate 40, and a limitation on a substrate layout can be decreased.

According to the four-port type charger 10 of the present embodiment configured as above, in four terminal plates 43 to 46, the terminal plates 43 and 44 are supported by one terminal receiving board 41, and similarly, the terminal plates 45 and 46 are supported by one terminal receiving board 42. Accordingly, compared to the configuration in which four terminal plates 43 to 46 are supported by separate terminal receiving boards, the number of parts of the terminal receiving board can be halved, and thus, the space in the main body housing 20 can be effectively used, and a large mounting area of the control substrate 40 can be secured.

Moreover, the common drain channels 41c (42c) and drain outlets 41d (42d) can be provided on one terminal receiving board 41 (42) supporting two terminal plates 43 and 44 (45 and 46), and also according to this, the common parts and configurations can be used, and in this regard, the space in the main body housing 20 can be further effectively used.

In addition, the top plate portions 41a and 42a, in which each height dimension from the control substrate 40 is one step higher than each of the bottom portions 41b and 42b supporting terminal plates 43 to 46, are provided on the exemplified terminal receiving boards 41 and 42. Therefore, for example, a large electronic part having a larger height dimension such as a capacitor or a transformer can be disposed on the lower portions of both top plate portions 41a and 42a, and in this regard, a degree of freedom on the mounting part layout on the control substrate 40 can be increased.

Various modifications can be applied to the exemplified embodiment. For example, the configuration is exemplified in which four terminal plates 43 to 46 are divided into two groups and each group is supported by one of the terminal receiving boards 41 and 42. However, a configuration in which four terminal plates 43 to 46 are supported by one terminal receiving board may be adopted. In this case, all four terminal plates 43 to 46 can have a drain function by one drain channel and one drain outlet.

Moreover, the drain channels 41c and 42c and the drain outlets 41d and 42d may be configured to be individually provided on each of the terminal plates 43 to 46. In addition, the drain channels 41c and 42c and the drain outlets 41d and 42d may be omitted.

Moreover, the top plate portions 41a and 42a of the terminal receiving boards 41 and 42 may be omitted.

The above-described configurations can be understood by the following seventeenth to nineteenth related embodiments.

According to the seventeenth related embodiment, there is provided a multi-port type charger in which a plurality of battery packs are simultaneously mounted and can be charged, in which a plurality of terminal plates to which the plurality of battery packs are connected are supported by a main body housing via a common terminal receiving board.

According to the seventeenth related embodiment, compared to a configuration in which the plurality of terminal plates are supported by an individual terminal receiving board, common parts are increased, a space in the main body housing is effectively used, and an increase in a mounting area of the control substrate can be easily secured.

For example, in the case of the four-port type charger, four terminal plates are grouped in two, two terminal plates are supported by one terminal receiving board, and thus, two terminal receiving boards can support four terminal plates. In this way, for example, one drain channel is provided on the terminal receiving boards in which the parts are commonly used, and thus, two terminal plates can function as a drain channel. Four terminal plates may be configured to be supported by one terminal receiving board.

According to the eighteenth related embodiment, in the seventeenth related embodiment, a common drain channel is provided on the plurality of terminal plates in the terminal receiving board.

According to the eighteenth related embodiment, the common terminal receiving board is used for the plurality of terminal plates, and thus, compared to the configuration in which individual terminal receiving boards are used, the space in the main body housing can be effectively used, and an increase in a mounting area of the control substrate can be secured.

According to the nineteenth related embodiment, in the seventeenth or eighteenth related embodiment, the terminal receiving board is bent upward between the plurality of terminal plates, and the height of the terminal receiving board is higher than the attachment portion of the terminal plate.

According to the nineteenth related embodiment, when the control substrate is disposed at the lower portion of the terminal receiving board, a part such as a transformer having a large height dimension can be disposed on the control substrate in the lower portion between the plurality of terminal plates, and in this regard, the limitation in the layout of the mounting part on the control substrate can be decreased.

Next, as shown in FIGS. 1 to 5, right and left end top plate portions 15 and 16 having a narrow width, and top plate portions 17 to 19 having a wide width at three locations in the center are provided on the upper divided housing 21 of the main body housing 20 on the upper surface of the charger 10. The first battery attachment portion 11 is disposed between the first left end top plate portion 15 and the second center left side top plate portion 17. The second battery attachment portion 12 is disposed between the second top plate portion 17 and the third center top plate portion 18. The third battery attachment portion 13 is disposed between the third top plate portion 18 and the fourth center right side top plate portion 19. The fourth battery attachment portion 14 is disposed between the fourth top plate portion 19 and the fifth right end top plate portion 16.

Each of the top plate portions 15 to 19 is set to the same height position and is set to a higher position than each of the terminal covers 11c to 14c of the battery attachment portions 11 to 14. Moreover, each of the receiving rail portions 11a, 11a to 14a, 14a of the battery attachment portions 11 to 14 is provided to protrude to the opposite inner side along the upper surface of each of the top plate portions 15 to 19.

In this way, since each of the first to fourth battery attachment portions 11 to 14 is disposed at a lower region than each of the first to fifth top plate portions 15 to 19 positioned at both right and left sides, for example, even when the charger 10 accidentally falls on the floor, or even when other articles such as an electric tool are accidentally disposed on the charger 10 mounted on a work table, or the like, each of the battery attachment portions 11 to 14 does not directly collide with the floor surface, or other articles do not directly come into contact with or do not collide with each of the battery attachment portions 11 to 14, and thus, damage to each of the battery attachment portions 11 to 14 can be avoided in advance. Accordingly, each of the first to fifth top plate portions 15 to 19 can function as a side guide portion of each of the battery attachment portions 11 to 14.

As shown in FIGS. 1, 5, 13, and 17, each of the first to fifth top plate portions 15 to 19 extends in the front-rear direction along the upper surface of the main body housing 20. An inclined surface, which is inclined at a larger angle in a direction descending to the front surface side, is provided on the front surface side of each of the first to fifth top plate portions 15 to 19. Operation display portions 51 and 52 for informing the operation state of each of the first to fourth battery attachment portions 11 to 14 are provided on inclined surfaces 17a and 19a of the second top plate portion 17 and the fourth top plate portion 19 positioned at the right side and left side of the center. The first left operation display portion 51 is disposed between the first battery attachment portion 11 and the second battery attachment portion 12, and the second right operation display portion 52 is disposed between the third battery attachment portion 13 and the fourth battery attachment portion 14. LEDs 51a and 51b which display the operating conditions of the first battery attachment portion 11 and the second battery attachment portion 12 are collectively disposed on the first left operation display portion 51. LEDs 52a and 52b which display the operating conditions of the third battery attachment portion 13 and the fourth battery attachment portion 14 are collectively disposed on the second right operation display portion 52.

Four LEDs are disposed on each of both operation display portions 51 and 52. In the first operation display portion 51, the operation state of the first battery attachment portion 11 is displayed by two upper and lower LEDs of the left side, and the operation state of the second battery attachment portion 12 is displayed by two upper and lower LEDs of the right side. Moreover, in the second operation display portion 52, the operation state of the third battery attachment portion 13 is displayed by two upper and lower LEDs of the left side, and the operation state of the fourth battery attachment portion 14 is displayed by two upper and lower LEDs of the right side. In each of both operation display portions 51 and 52, a green LED 51a is disposed at the upper side, and a red LED 51b is disposed at the lower side. Information such as "during charging" or "charge complete" of each of the battery attachment portions 11 to 14 is informed by combining flashing, lighting, and turning-off of two upper and lower LEDs 51a and 51b, and 52a and 52b.

In this way, since the first and second operation display portions 51 and 52, which display the operations of the first to fourth battery attachment portions 11 to 14 by the LEDs, are disposed on the inclined surfaces 17a and 19a of the front surface which are easily seen by the user, when the charger 10 is mounted on the worktable or when the charger is mounted in a wall-hanging state, it is possible to easily and visually recognize the charging state of the battery packs B.

Moreover, the operation states of the first and second battery attachment portions 11 and 12 are collectively displayed on the first single operation display portion 51, and the operation states of the third and fourth battery attachment portions 13 and 14 are collectively displayed on the second single operation display portion 52. Accordingly, compared to a case when the operation display portions are individually set for each of the battery attachment portions 11 to 14, much information can be informed in a smaller space.

According to the charger 10 of the present embodiment configured as described above, the engagement convex portions 28 and 28 of the wall surface W side are hooked to the pair of right and left hook portions (tumbler-shaped hole) 27e and 27e which are provided on the bottom surface 27 of the main body housing 20, and the fixing screws 29 and 29 are fastened to the pair of right and left fixing holes 30 and 30, and thus it is possible to mount the main body housing 20 and the charger 10 in a wall-hanging state on the wall surface W. Accordingly, compared to the hook state of the related art in which only the tumbler-shaped hole is used, it is possible to mount the charger 10 in a more stable wall-hanging posture, and for example, even when a person carelessly comes into contact with the charger 10 in the wall-hanging state or the like, positional deviation does not occur.

Moreover, since the charger is mounted in the state where the charger is completely fixed to the wall surface W, the user can operate the battery pack B with one hand even when the battery pack B is attached to or is detached from the battery attachment portions 11 to 14 of the charger 10. In this regard, handleability of the charger 10 in the wall-hanging mounting state can be increased.

In addition, according to the exemplified charger 10, since the fixing hole 30 is provided on the bottom portion (bottom edge portion 26a) of the lower recessed portion 26 provided at the position which does not protrude from the side area S in a planar view of the main body housing 20, strength of the bottom edge portion 26a is increased, and thus, the charger is not easily damaged. Accordingly, the thickness of each of the bottom edge portions 26a and 26a is decreased, and thus, the required length of each of the fixing screws 29 and 29 can be shortened. Moreover, the screwing is performed through the fixing holes 30 and 30 on the lower divided housing 22 side rather than the upper divided housing 21 side. In this regard, it is possible to securely and rigidly fix the main body housing 20 to the wall surface W by short fixing screws 29 and 29.

Moreover, the bottom edge portions 25a and 25a of the upper recessed portions 25 and 25 are disposed to cover the upper portion of the bottom edge portions 26a and 26a of the lower recessed portions 26 and 26 in which the fixing holes 30 and 30 are provided, and thus, the bottom edge portions 26a and 26a of the lower recessed portions 26 and 26 can be configured so as not to be easily damaged.

Moreover, the through-holes (strap attachment holes 31 and 31) which are coaxial with the fixing holes 30 and 30 are provided on the bottom edge portions 25a and 25a of the upper recessed portions 25 and 25, the through-holes are used as operating holes into which a driver (screwdriver) D is inserted, and thus the fastening operations of the fixing screws 29 and 29 with respect to the fixing holes 30 and 30 can be performed rapidly and conveniently. In this regard, it is possible to increase workability in the mounting of the charger 10.

In addition, since the strap attachment holes 31 and 31 (through-holes) are provided on the upper divided housing 21 and the fixing holes 30 and 30 are provided on the lower divided housing 22, when the housings are manufactured by resin molding, a molding die can be more simplified, and there can be reduction in a manufacturing cost of the charger 10.

Various modifications can be applied to the exemplified embodiment. For example, although the configuration is exemplified in which the upper and lower recessed portions 25, 25, 26, and 26 are provided on the rear surface side of the main body housing 20 and the fixing holes 30 and 30 are provided on the bottom edge portions 26a and 26a, the similar configurations may be provided on the right and left portions of the main body housing 20.

Moreover, instead of the front surface side hook portions 27e and 27e, a fixing hole for fastening a fixing screw may be provided, or the hook portions 27e and 27e may be omitted, or the fixing screws 29 and 29 may be fastened to only the fixing holes 30 and 30 of the rear surface side, so that the charger may be fixed in a wall-hanging state.

Moreover, the bottom edge portions 25a and 25a of the upper recessed portions 25 and 25 may be omitted, and the lower recessed portions 26 and 26 may be open to the upper surface of the main body housing 20.

Moreover, the four-port type charger 10 is exemplified. However, the present embodiment may be similarly applied to a charger of one-port type, two-port type, three-port type, or five or more-port type battery attachment portion.

In the exemplified wall-hanging structure, by screwing to the wall, the charger can be mounted in a more stable wall-hanging posture than the hooking state in which only the tumbler-shaped hole is used. In contrast, in a wall-hanging structure according to a second embodiment described below, the fixing hole for screwing is omitted and a hook structure using the tumbler-shaped hole is provided, and similar effects can be also obtained by the related second embodiment.

Figure 25:
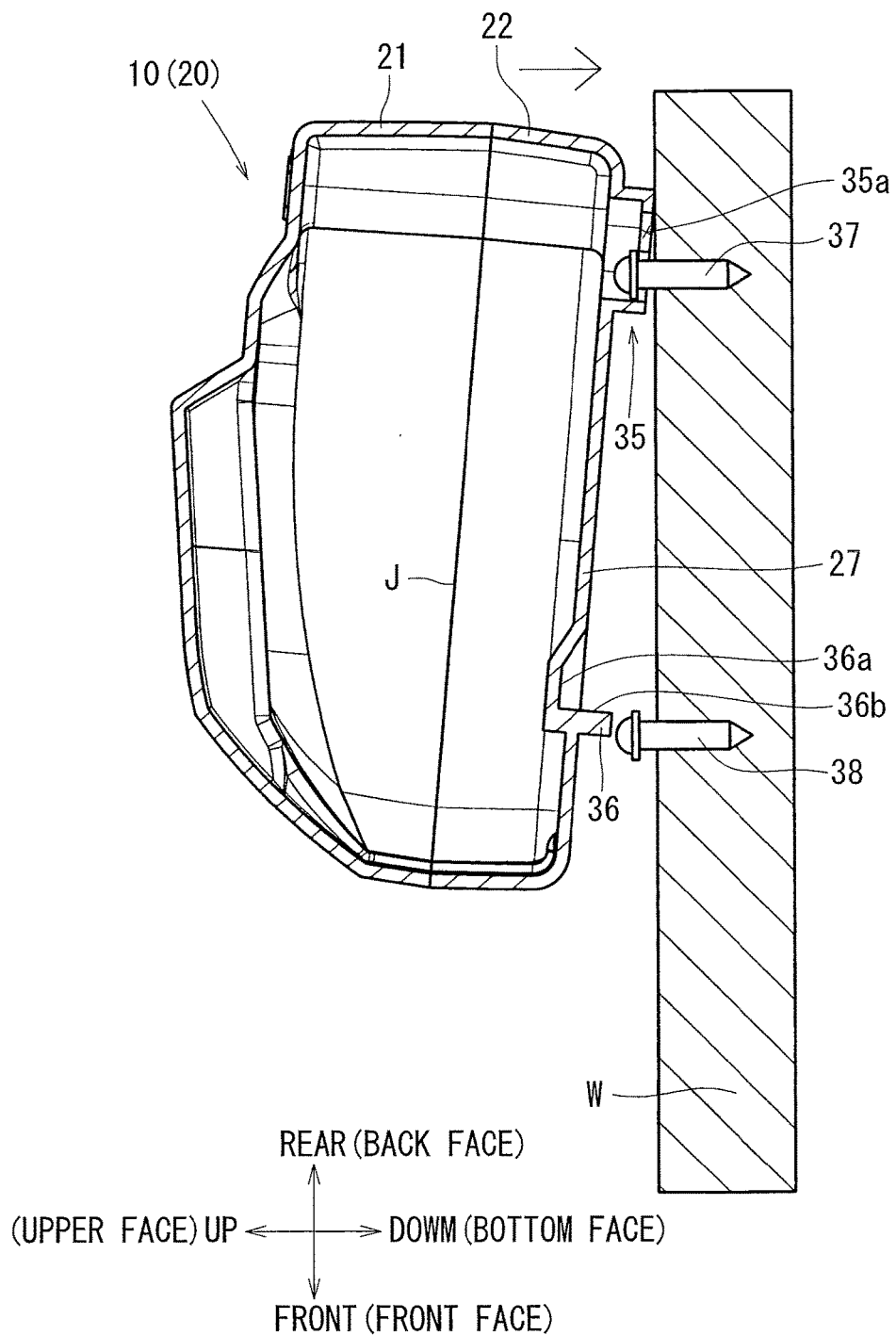
FIG. 25 is a view showing a second embodiment of the wall-hanging structure of the charger, and a longitudinal cross-sectional view of the charger. The figure shows a state where a lower leg is floated from a wall surface and a hook convex portion is inserted into an upper leg.
Figure 26:
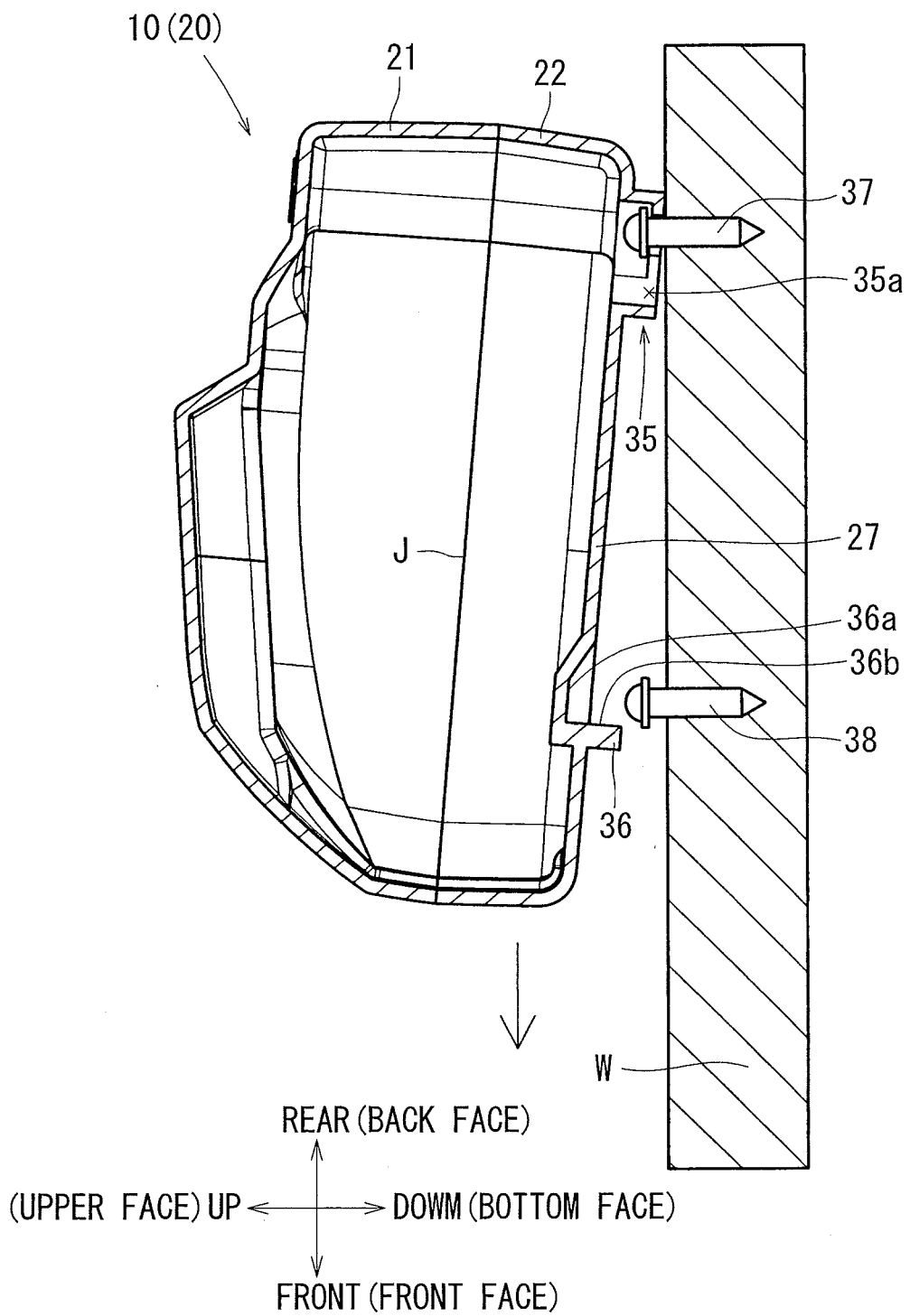
FIG. 26 is a view showing the second embodiment of the wall-hanging structure of the charger, and a longitudinal cross-sectional view of the charger. The figure shows a state where the charger is displaced to the lower side and the hook convex portion is hooked to the upper leg.
Figure 27:
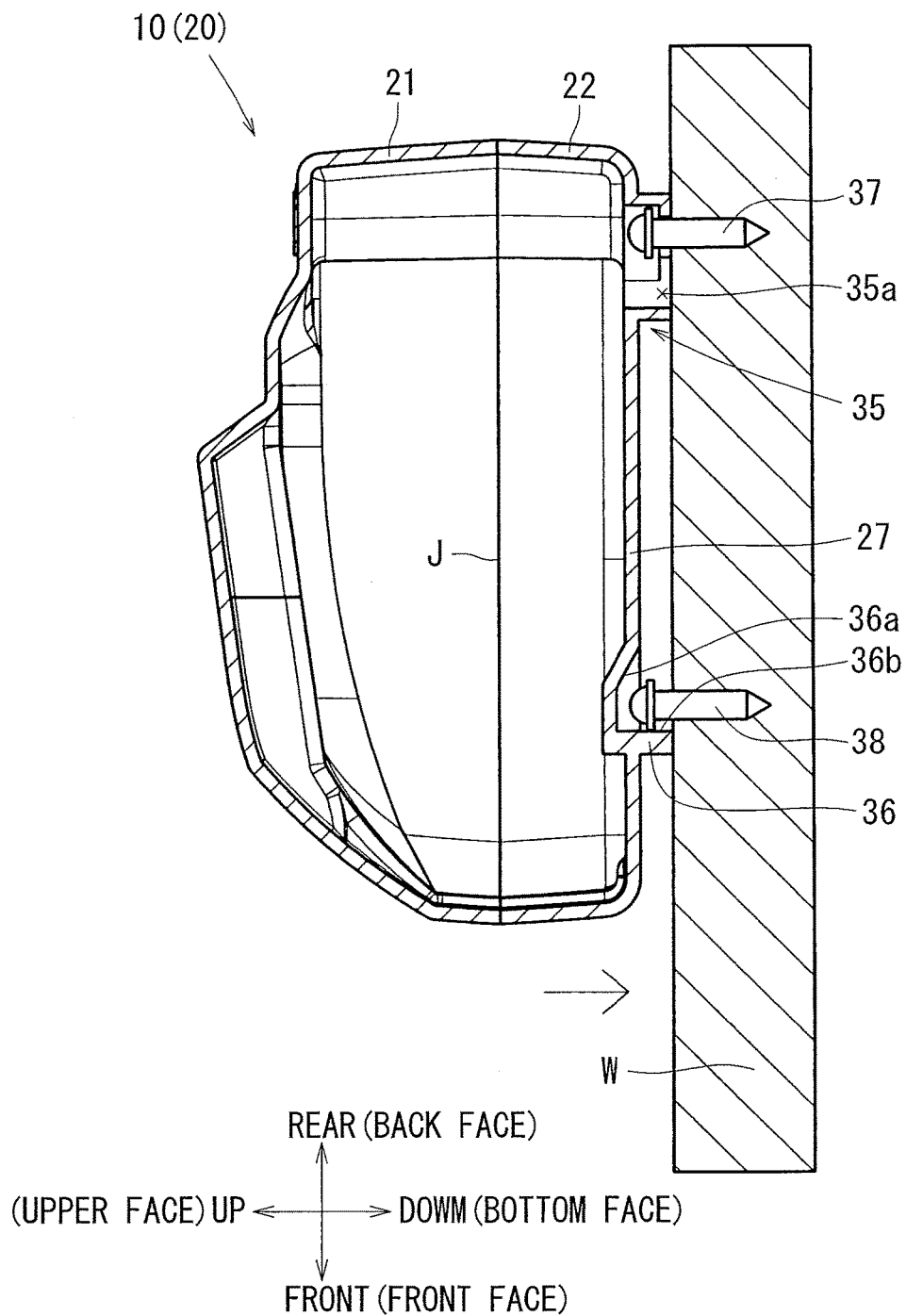
FIG. 27 is a view showing the second embodiment of the wall-hanging structure of the charger, and a longitudinal cross-sectional view of the charger. The figure shows the wall-hanging state in which the lower leg abuts the wall surface.

FIGS. 25 to 27 show the wall-hanging structure according to the second embodiment. The same reference numerals are used with respect to the portions and configurations which do not need modifications, and descriptions thereof are omitted. Hook portions 35 and 35 and regulating portions 36 and 36 are provided on four corners of the bottom surface 27 of the main body housing 20. Recessed hook portions 35a having a tumbler-shaped hole shape are provided on each of the pair of right and left hook portions 35 and 35 of the rear surface side. Each of the pair of right and left regulating portions 36 and 36 of the front surface side is a wall portion which protrudes to the wall surface W side, and a recessed releasing portion 36a is provided on the base side of the regulating portion. Each of the recessed releasing portions 36a and 36a is provided on the rear surface side of the regulating portion 36. The regulating portions 36 and 36 are integrally molded to the bottom surface 27 of the main body housing formed of a synthetic resin.

Hook convex portions 37 and 37 corresponding to the hook portions 35 and 35 of the rear surface side are provided on the wall surface W on which the charger 10 is mounted. Moreover, engagement convex portions 38 and 38 corresponding to the pair of right and left regulating portions 36 and 36 are provided on the lower portion of the right and left hook convex portions 37 and 37.

In order to mount the charger 10 in a wall-hanging state on the wall surface W, first, as shown in FIG. 25, the hook convex portions 37 are inserted into each of the upper side recessed hook portions 35a and 35a. At this time, as shown in the drawings, the front surface side of the charger 10 rises up from the wall surface W, and an inclined posture in which the front surface side regulating portions 36 and 36 are inclined so as not to interfere with the engagement convex portions 38 and 38 is maintained, and the upper side hook convex portions 37 and 37 are inserted into the recessed hook portions 35a and 35a. Thereafter, as shown in FIG. 26, the charger 10 moves to the lower portion, and each of the hook convex portions 37 and 37 are hooked to the recessed hook portion 35a. The charger 10 moves to the lower portion, and thus, the front surface side regulating portions 36 and 36 are displaced to the front sides (lower side) of the lower side engagement convex portions 38 and 38.

As shown in FIG. 26, in the state where the charger 10 moves to the lower side and the lower side regulating portions 36 and 36 are displaced to the front sides of the engagement convex portions 38 and 38, when the front surface side of the charger 10 moves to the wall surface W side and the regulating portions 36 and 36 abut the wall surface W as shown in FIG. 27, the mounting of the charger 10 to the wall surface W is completed. Each of the front surface side regulating portions 36 and 36 abuts the wall surface W in the front sides (lower side) of the engagement convex portions 38 and 38.

In this mounting state, each of the upper side hook portions 35 and 35 abuts the wall surface W, and the hook convex portion 37 is inserted into each of the recessed hook portions 35a and 35a having a tumbler-shaped hole shape. Accordingly, in the charger 10, the displacement to the lower portion, the displacement to the right and left sides, and the displacement in a direction away from the wall surface W are regulated. Moreover, in the mounting state as shown in FIG. 27, the front surface side regulating portions 36 and 36 are positioned below the lower side engagement convex portions 38 and 38 and function as a stopper, and thus, the upward displacement of the charger 10 is regulated.

In addition, each of the rear surfaces (the upper surfaces in the wall-hanging mounting state) 36b and 36b of both regulating portions 36 and 36 is molded to be perpendicular to the wall surface W in the wall-hanging mounting state, and thus, reliable engagement states with respect to the engagement convex portions 38 and 38 can be obtained.

In this way, according to the wall-hanging structure of the second embodiment, the charger 10 is mounted on the wall surface W in the state where the positional deviation of the charger in both the up and the down directions (attachment and detachment directions of the battery pack B) is regulated. Accordingly, when the battery pack B slides toward the lower portion and is attached with respect to the first to fourth battery attachment portions 11 to 14 of the charger 10 in the wall-hanging state, the user does not need to press the charger 10 with a hand so that the charger 10 is not displaced downward, and when the user slides the battery pack B while grasping the battery pack B with one hand, it is possible to rapidly and simply attach the battery pack B to the battery attachment portions 11 to 14. Moreover, conversely, when the battery pack B is detached from the battery attachment portions 11 to 14 and it is sufficient for the user to slide the battery pack B to the upper portion while grasping the battery pack B with one hand, the user does not need to press the charger 10 so that the charger is not displaced. In this regard, handleability (operability) of the charger 10 can be increased.

In addition, according to the wall-hanging structure of the exemplified second embodiment, since the displacement in the up-down and right-left directions of the charger 10 and the displacement of the charger 10 in the direction away from the wall surface W are regulated, even when a person carelessly comes into contact with the charger or the like, the positional deviation is assuredly prevented.

Especially, since the rear surfaces 36b and 36b of both lower side regulating portions 36 and 36 are formed to be perpendicular to the wall surface W in the detachment direction (upward direction) of the charger, the hooked state of each of the rear surfaces 36b and 36b with respect to the engagement convex portions 38 and 38 is more accurately maintained, and as a result, the displacement in the detachment direction of the charger 10 is securely regulated, and convenience in the detachment operation is improved.

On the other hand, for example, when the rear surfaces of both regulating portions 36 and 36 are provided to be inclined in a direction (an obtuse angle direction with respect to the bottom portion of the recessed portion 36a) in which the tip side is displaced to the lower portion considering a draft angle of a molding die, the displacement in the detachment direction (the upward direction in the wall-hanging mounting state) of the charger 10 is easily permitted, and the hooked state of the charger with respect to the engagement convex portion 38 becoming unstable. Accordingly, when the user grasps the battery pack B with one hand and detaches the battery pack from the battery attachment portions 11 to 14, the user needs to press the charger with the other hand so that the charger 10 itself is not displaced, and in this regard, usability of the charger 10 is decreased.

Therefore, as exemplified, with respect to the angles of the rear surfaces 36b and 36b of both regulating portions 36 and 36, in addition to the configuration in which the rear surfaces are molded to be perpendicular to the wall surface W, more preferably, the rear surfaces are molded to be inclined in a direction of an acute angle in which the tip side is displaced upward.

What is claimed is:

1. A charger comprising:
   a main body housing that includes a bottom surface, the charger capable of being mounted along a wall surface at the bottom surface of the main body in a wall-hanging manner;
   a battery attachment portion to which a battery pack downwardly slides to attach and from which the battery pack upwardly slides to detach in the wall-hanging manner; and a regulating member that engages with the wall surface such that the regulating member regulates a relative displacement of the main body housing with respect to the wall surface in a detachment direction of the battery pack, wherein:
   the main body housing includes a two-piece structure in which a lower divided housing and an upper divided housing are mated with each other at a joining surface, the upper divided housing including the battery attachment portion and the lower divided housing being disposed closest to the wall surface when the charger is mounted along the wall surface;
   a lower recessed portion that is inwardly recessed in a side face area viewing from a view perpendicular to the joining surface is provided in the lower divided housing; an entirety of the lower recessed portion does not overlap the battery attachment portion viewing from the view perpendicular to the joining surface;
   a fixing hole for screwing the main body housing to the wall surface is provided on a bottom edge portion of the lower recessed portion; and a fixing screw that is inserted to the fixing hole for screw-fastening functions as the regulating member;
   an upper recessed portion is provided in the upper divided housing such that the upper recessed portion is positioned directly above the lower recessed portion viewing from the view perpendicular to the joining surface; and
   a bottom edge portion of the upper recessed portion is positioned above the fixing hole.

2. The charger according to claim 1, wherein a through-hole that is coaxial with the fixing hole is provided in the bottom edge portion of the upper recessed portion.

3. The charger according to claim 2, wherein the through-hole functions as a strap attachment hole for attaching a strap for carrying the charger on the shoulder.

4. The charger according to claim 1, wherein the lower recessed portion is provided in the lower divided housing extending from a side face of the lower divided housing to an interior thereof, the lower recessed portion being disposed in the vicinity of right and left ends of the side face of the lower divided housing, respectively.

* * * * *